US009400657B2

(12) United States Patent
Busaba et al.

(10) Patent No.: US 9,400,657 B2
(45) Date of Patent: Jul. 26, 2016

(54) DYNAMIC MANAGEMENT OF A TRANSACTION RETRY INDICATION

(71) Applicant: International Business Machines Corporation, Armonk, NY (US)

(72) Inventors: Fadi Y. Busaba, Poughkeepsie, NY (US); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 593 days.

(21) Appl. No.: 13/868,392

(22) Filed: Apr. 23, 2013

(65) Prior Publication Data

US 2013/0339959 A1    Dec. 19, 2013

Related U.S. Application Data

(63) Continuation of application No. 13/524,330, filed on Jun. 15, 2012.

(51) Int. Cl.
*G06F 9/46*       (2006.01)
*G06F 9/44*       (2006.01)
    (Continued)

(52) U.S. Cl.
CPC .............. *G06F 9/44* (2013.01); *G06F 9/3004* (2013.01); *G06F 9/30076* (2013.01); *G06F 9/30145* (2013.01); *G06F 9/3857* (2013.01); *G06F 9/466* (2013.01); *G06F 9/467* (2013.01);
    (Continued)

(58) Field of Classification Search
CPC ..................................................... G06F 9/467
See application file for complete search history.

(56) References Cited

U.S. PATENT DOCUMENTS

| 4,513,367 A | 4/1985 | Chan et al. |
| 5,278,961 A | 1/1994 | Mueller |

(Continued)

FOREIGN PATENT DOCUMENTS

WO        2007115003        10/2007

OTHER PUBLICATIONS

Titos, Ruben, "Directory-Based Conflict Detection in Hardware Transactional Memory", HIPC 2008, Lecture Notes in Computer Science, 2008, vol. 5374/2008, pp. 541-554.

(Continued)

*Primary Examiner* — Andrew Caldwell
*Assistant Examiner* — Michael Metzger
(74) *Attorney, Agent, or Firm* — Cantor Colburn LLP; Margaret McNamara

(57) ABSTRACT

Embodiments relate to dynamic management of a transaction retry indication. One aspect is a system that includes a transactional facility configured to support transactions that effectively delay committing stores to memory or results to an architectural state until transaction completion, and a processor configured to identify a transaction abort reason associated with an aborted transaction of an initiating program. Transaction success and transaction abort history are tracked. Based on determining by the processor that the transaction abort reason was caused by the initiating program, a retry indication is assigned based on a static mapping of the transaction abort reason. Based on determining by the processor that the transaction abort reason was not caused by the initiating program, the retry indication is assigned based on a retry process using the transaction abort reason, the transaction abort history, and a current processor configuration.

12 Claims, 24 Drawing Sheets

(51) Int. Cl.
*G06F 9/30* (2006.01)
*G06F 9/38* (2006.01)
*G06F 9/50* (2006.01)

(52) U.S. Cl.
CPC .............. *G06F 9/50* (2013.01); *G06F 9/5011* (2013.01); *G06F 2209/507* (2013.01)

(56) References Cited

U.S. PATENT DOCUMENTS

| | | |
|---|---|---|
| 5,657,472 A | 8/1997 | Van Loo et al. |
| 5,765,191 A | 6/1998 | Loper et al. |
| 6,240,489 B1 | 5/2001 | Durham et al. |
| 6,725,337 B1 | 4/2004 | Tan et al. |
| 6,816,455 B2 | 11/2004 | Goldberg et al. |
| 7,421,544 B1 | 9/2008 | Wright et al. |
| 7,496,726 B1 | 2/2009 | Nussbaum et al. |
| 7,644,238 B2 | 1/2010 | Carrie |
| 7,694,304 B2 | 4/2010 | Kissell |
| 7,703,098 B1 | 4/2010 | Moir et al. |
| 8,037,476 B1 | 10/2011 | Shavit et al. |
| 8,095,750 B2 | 1/2012 | Heller, Jr. |
| 8,117,403 B2 | 2/2012 | Heller, Jr. et al. |
| 8,127,057 B2 | 2/2012 | Chung et al. |
| 2006/0085591 A1 | 4/2006 | Kumar et al. |
| 2006/0242367 A1 | 10/2006 | Ramakrishnan et al. |
| 2006/0288173 A1 | 12/2006 | Shen |
| 2007/0055827 A1 | 3/2007 | Tsien |
| 2007/0143550 A1 | 6/2007 | Rajwar et al. |
| 2007/0239942 A1 | 10/2007 | Rajwar et al. |
| 2007/0245099 A1 | 10/2007 | Gray et al. |
| 2007/0260942 A1 | 11/2007 | Rajwar et al. |
| 2008/0270745 A1 | 10/2008 | Saha et al. |
| 2009/0031310 A1 | 1/2009 | Lev et al. |
| 2009/0113443 A1 | 4/2009 | Heller, Jr. et al. |
| 2009/0172306 A1* | 7/2009 | Nussbaum .............. G06F 9/466 711/154 |
| 2009/0217013 A1 | 8/2009 | Caprioli |
| 2009/0292884 A1 | 11/2009 | Wang et al. |
| 2010/0023707 A1 | 1/2010 | Hohmuth et al. |
| 2010/0169581 A1 | 7/2010 | Sheaffer et al. |
| 2010/0332753 A1* | 12/2010 | Gray .................... G06F 12/0831 711/118 |
| 2010/0332901 A1 | 12/2010 | Nussbaum et al. |
| 2010/0333093 A1 | 12/2010 | Nussbaum et al. |
| 2011/0055483 A1 | 3/2011 | Heller, Jr. |
| 2011/0138126 A1 | 6/2011 | Blundell et al. |
| 2011/0145637 A1 | 6/2011 | Gray et al. |
| 2011/0208921 A1 | 8/2011 | Pohlack et al. |
| 2011/0209151 A1 | 8/2011 | Chung et al. |
| 2011/0258401 A1 | 10/2011 | Desota et al. |
| 2011/0307689 A1 | 12/2011 | Chung et al. |
| 2012/0124563 A1 | 5/2012 | Chung et al. |
| 2012/0284485 A1 | 11/2012 | Yamada et al. |
| 2012/0304002 A1 | 11/2012 | Chen et al. |
| 2013/0339615 A1 | 12/2013 | Alexander et al. |
| 2013/0339627 A1 | 12/2013 | Alexander et al. |

OTHER PUBLICATIONS

IBM, "zArchitecture—Principles of Operation," SA22-7832-8, Ninth Edition, Aug. 2010, pp. 1-1496, http://www.ibm.com/support/documentation.

* cited by examiner

| CODE | REASON FOR ABORT | CC SET |
|---|---|---|
| 2 | EXTERNAL INTERRUPTION | 2 |
| 4 | PROGRAM INTERRUPTION (UNFILTERED) | 2 OR 3 + |
| 5 | MACHINE - CHECK INTERRUPTION | 2 |
| 6 | I/O INTERRUPTION | 2 |
| 7 | FETCH OVERFLOW | 2 OR 3 |
| 8 | STORE OVERFLOW | 2 OR 3 |
| 9 | FETCH CONFLICT | 2 |
| 10 | STORE CONFLICT | 2 |
| 11 | RESTRICTED INSTRUCTION | 3 |
| 12 | PROGRAM INTERRUPTION CONDITION (FILTERED) | 3 |
| 13 | NESTING DEPTH EXCEEDED | 3 |
| 14 | CACHE FETCH RELATED | 2 OR 3 |
| 15 | CACHE STORE RELATED | 2 OR 3 |
| 16 | CACHE OTHER | 2 OR 3 |
| 255 | UNDETERMINED CONDITION | 2 OR 3 |
| >255 | TABORT INSTRUCTION | 2 OR 3 |
| ‡ | CANNOT BE DETERMINED; NO TDB STORED | 1 |

EXPLANATION:
+ CONDITION CODE IS BASED ON INTERRUPTION CODE

‡ THIS SITUATION OCCURS WHEN A TRANSACTION ABORTS, BUT THE TDB HAS BECOME INACCESSIBLE SUBSEQUENT TO THE SUCCESSFUL EXECUTION OF THE OUTERMOST TBEGIN INSTRUCTION. NO TBEGIN SPECIFIED TDB IS STORED, AND THE CONDITION CODE IS SET TO 1.

DYNAMIC MANAGEMENT OF A TRANSACTION RETRY INDICATION

CROSS-REFERENCE TO RELATED APPLICATIONS

This is a continuation application that claims the benefit of U.S. patent application Ser. No. 13/524,330 filed Jun. 15, 2012, the contents of which are incorporated by reference herein in their entirety.

BACKGROUND

One or more aspects of the invention relate, in general, to multiprocessing computing environments, and in particular, to dynamic management of a transaction retry indication.

An enduring challenge in multiprocessor programming is that of updates to the same storage location by multiple central processing units (CPUs). Many instructions that update storage locations, including even simple logical operations, such as AND, do so with multiple accesses to the location. For instance, first, the storage location is fetched, and then, the updated result is stored back.

In order for multiple CPUs to safely update the same storage location, access to the location is serialized. One instruction, the TEST AND SET instruction, introduced with the S/360 architecture formerly offered by International Business Machines Corporation, provided an interlocked update of a storage location. Interlocked update means that, as observed by other CPUs and the input/output (I/O) subsystem (e.g., channel subsystem), the entire storage access of the instruction appears to occur atomically. Later, the S/370 architecture offered by International Business Machines Corporation introduced the COMPARE AND SWAP and COMPARE DOUBLE AND SWAP instructions that provide a more sophisticated means of performing interlocked update, and allow the implementation of what is commonly known as a lock word (or semaphore). Recently added instructions have provided additional interlocked-update capabilities, including COMPARE AND SWAP AND PURGE, and COMPARE AND SWAP AND STORE.

More complex program techniques may require the interlocked update of multiple storage locations, such as when adding an element to a doubly-linked list. In such an operation, both a forward and backward pointer are to appear to be simultaneously updated, as observed by other CPUs and the I/O subsystem. In order to affect such a multiple location update, the program is forced to use a separate, single point of serialization, such as a lock word. However, lock words may provide a much courser level of serialization than is warranted; for example, the lock words may serialize an entire queue of millions of elements, even though only two elements are being updated. The program may structure the data to use finer-grained serialization (e.g., a hierarchy of lock points), but that introduces additional problems, such as potential deadlock situations if the hierarchy is violated, and recovery issues if the program encounters an error while holding one or more locks or if the lock cannot be acquired.

In addition to the above, there are numerous scenarios where a program may execute a sequence of instructions that may or may not result in an exception condition. If no exception condition occurs, then the program continues; however, if an exception is recognized, then the program may take corrective action to eliminate the exception condition. Java®, as one example, can exploit such execution in, for instance, speculative execution, partial in-lining of a function, and/or in the re-sequencing of pointer null checking.

In classic operating system environments, such as z/OS and its predecessors offered by International Business Machines Corporation, the program establishes a recovery environment to intercept any program-exception condition that it may encounter. If the program does not intercept the exception, the operating system typically abnormally terminates the program for exceptions that the operating system is not prepared to handle.

SUMMARY

An embodiment includes a system for dynamic management of a transaction retry indication. The system includes a transactional facility configured to support transactions that effectively delay committing stores to memory or results to an architectural state until transaction completion, and a processor configured to identify a transaction abort reason associated with an aborted transaction of an initiating program. Transaction success and transaction abort history are tracked. Based on determining by the processor that the transaction abort reason was caused by the initiating program, a retry indication is assigned based on a static mapping of the transaction abort reason. The retry indication provides an indication to the initiating program on whether to retry the aborted transaction. Based on determining by the processor that the transaction abort reason was not caused by the initiating program, the retry indication is assigned based on a retry process using the transaction abort reason, the transaction abort history, and a current processor configuration.

An additional embodiment includes a method for dynamic management of a transaction retry indication in a transactional facility. The method includes identifying, by a processor, a transaction abort reason associated with an aborted transaction of an initiating program. Transaction success and transaction abort history are tracked. Based on determining by the processor that the transaction abort reason was caused by the initiating program, a retry indication is assigned based on a static mapping of the transaction abort reason. The retry indication provides an indication to the initiating program on whether to retry the aborted transaction. Based on determining by the processor that the transaction abort reason was not caused by the initiating program, the retry indication is assigned based on a retry process using the transaction abort reason, the transaction abort history, and a current processor configuration.

A further embodiment includes a computer program product for dynamic management of a transaction retry indication in a transactional facility. The computer program product includes a tangible storage medium readable by a processing circuit of a processor and storing instructions for execution by the processing circuit for performing a method. The method includes identifying, by the processor, a transaction abort reason associated with an aborted transaction of an initiating program. Transaction success and transaction abort history are tracked. Based on determining by the processor that the transaction abort reason was caused by the initiating program, a retry indication is assigned based on a static mapping of the transaction abort reason. The retry indication provides an indication to the initiating program on whether to retry the aborted transaction. Based on determining by the processor that the transaction abort reason was not caused by the initiating program, the retry indication is assigned based on a retry process using the transaction abort reason, the transaction abort history, and a current processor configuration.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 10 depicts example reasons for abort, along with associated abort codes and condition codes, in accordance with an aspect of the present invention;

FIG. 13 depicts an example of transaction nesting with multiple depths in an embodiment;

DETAILED DESCRIPTION

Figure 1:
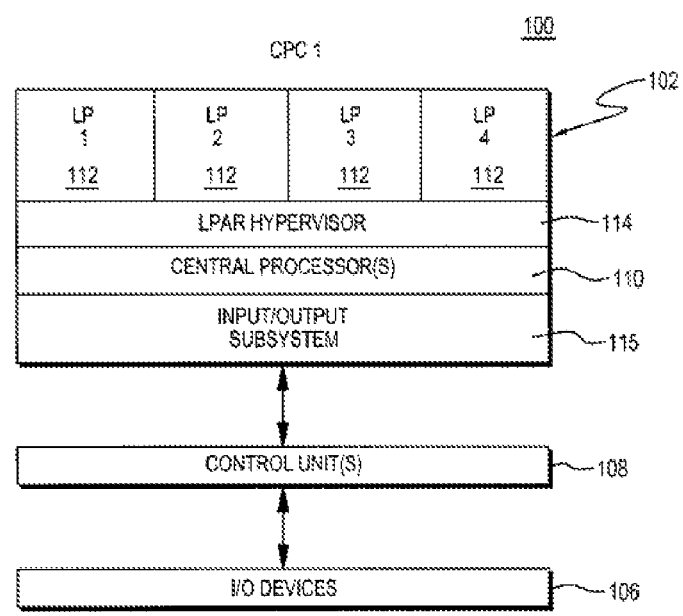
FIG. 1 depicts one embodiment of a computing environment to incorporate and use one or more aspects of the present invention.

In accordance with an aspect of the present invention, a transactional execution (TX) facility is provided. This facility provides transactional processing for instructions using nested levels of transactional processing.

In an embodiment, a transaction dispatcher manages instructions which may span multiple levels of nested transactions. The transaction nesting is managed such that the number and depth of transactions does not exceed hardware capacities. Furthermore, the nesting is managed in hardware, which relieves the software of the need to manage the complex nesting requirements. The transactions are processed as nested (i.e., inner transactions), abutted (i.e., outer transactions) or a combination of the two (i.e., inner transactions nested among outer transactions). The number of inner and outer transactions, including the maximum nesting depth, may be predetermined in hardware, configured by software, or determined automatically by the hardware.

Most of the work related to transaction execution has been concentrated on software based transactional memory management. Using hardware execution, a program uses an instruction (TBEGIN or TBEGINC) that marks the start of the transactional execution block and an instruction (TEND) to mark the end of the block. Instructions within the block are considered transactional and any storage loads and updates appear to be concurrent as observed by other CPUs and memory sub-channels. As a result the transactional execution block of instructions is either fully executed or not with respect to supported transactional facilities. If the instructions within the block cannot be completed concurrently, then the facilities in the execution block are rolled back with respect to any previously executed instructions within the transaction.

An instruction roll back may occur as a result of a transaction abort, which requires the hardware to restore the state of the processor to the value prior to the start of the transaction. The rollback requires the restoration of various instructions and values associated with the program status word (PSW), etc. In an embodiment, the hardware saves the previous values for these facilities if any of them are updated within a transaction, and upon an abort, the hardware restores the values of these facilities from the saved copies.

In an embodiment, software provides information (transaction controls) to hardware at the start of a transaction to convey the software's expectations for the transaction. For example, a TBEGIN instruction in z/Architecture has a program filtering and control (PIFC) field, an access register (AR) modification bit, and a floating point operation bit (F-bit) defined in the TBEGIN instruction. In an embodiment, if the F-bit is zero, then the software does not expect any floating point register (FPR) to be updated by the transaction and if any instruction attempts to update any FPR, the instruction will be aborted. With the F-bit cleared neither the software nor hardware is required to save any initial FPR values in order for the FPR to be restored in an abort condition.

In an embodiment, a transactional execution block may call other functions or subroutines which in turn have transactions in their body. These overlapping transactions result in a nested transaction. Each transaction nesting depth has its own effective transaction controls calculated from the cumulative transaction controls starting at a nesting depth level of one. The effective controls for each transaction depth and ID are saved in hardware, which affects, among other things, instruction execution and abort conditions, and any program exceptions encountered during execution within the transaction. For example, if the TBEGIN at level one (often referred to as outermost TBEGIN) has its F-bit set to zero prohibiting FPR updates, and the TBEGIN at level two has the F-bit set to one, the effective F-bit at level two is set to zero prohibiting FPR updates. If there is an abort due to violation at any nesting depth, the nested transaction is rolled back to the outermost TBEGIN.

In an embodiment, outermost transactions may be executed close to each other (i.e., a few instructions away) thus requiring a hardware solution that will handle multiple outermost transactions in the processor pipeline at the same time. Each of these outermost transactions may contain nested transactions, which adds additional hardware complexity for tracking and rolling back transactions in case of an abort.

In an embodiment, a set of transactions identified by the number of outermost transactions in the pipeline (j) and the nesting depth with each outermost transaction (i) is tracked by hardware in a queue with a size (X) of maximum(i)*maximum(j). In an embodiment, X is determined based on hardware limitations (i.e., the buffer size). The instructions in flight in the processor pipeline may be limited based on the nesting level i, and the transaction level j such that i*j does not exceed X. Therefore, the higher the value of i, the lower j will be. The hardware sets the limits, max(i), and max(j) which determine the size of the queue and will stop instruction processing (namely decoding or dispatching) when the queue is full. The hardware may also abort the transaction if the maximum hardware capacity for a single transaction has been exceeded. When supporting multiple software threads via simultaneous multi-threading (SMT), the hardware may track per thread (t), up to a maximum of max(t) threads, separate levels of j and i. In this case, instruction processing may also stop when additional entries are not available for a specific thread. In an embodiment, in order to support SMT the queue may be statically divided between the active threads, or may dynamically share the set of transactional queue entries.

Some software applications require a lot of close outermost transactions with very low nesting depth within a transaction, while other applications prefer deep nesting depths. For example, for a transactional queue with the size of 16, hardware may set max(j)=8 and max(i)=2 (i.e., eight outermost transactions, each with a nesting depth of two) when it expects low nesting depth and many close by outermost transactions. The hardware setting is also limited by a software configuration specifying the definite max(i) limit and/or a hint at the likely max(i) required. The software may also provide a hint that outermost transactions are likely to be in close proximity. In an embodiment, the hardware employs its own algorithm for adjusting the queue's allocations based on historical or heuristic based predictions together with the indications from software. The hardware may determine for example the minimum value for max(j) based on the total number of transactional queue entries divided by the specified max(i). If the software expects a lot of nested transactions, for example, the software may prime the hardware to set max(i)=16 (i.e., one outermost transaction with a nesting depth of 16). In an embodiment, the software may specify that its limit for max(i) to be either a hint for performance tuning, and/or a hard limit. If the software specifies a hard nesting limit and exceeds this limit, or if the software exceeds the maximum supported capacity for max(i) within the hardware, the transaction will be aborted and the software will receive an indication that it exceeded transactional limits and that the transaction should not be retried. In an embodiment, this retry indication is provided via a condition code (CC) set by the processor and accessible by the software. In an embodiment, If the software exceeds limits for max(i) which were specified as a hint, or which were selected by the hardware but do not exceed the maximum supported capacity for max(i) within the hardware, then the hardware may re-configure its allocations for max(i) and max(j) and provide an indication to the software that the transaction may be retried by the software. Similarly, if the transactional queue capacity is exceeded while the queue is being shared dynamically between software threads, the hardware may indicate to the software that the transaction may be retired and may limit the number of active threads utilizing the transactional queue to provide for the maximum supported max(i), and max(j) per thread.

In an embodiment, resources may be shared or used among different threads running concurrently on the same hardware. The hardware may be configured to run multiple threads simultaneously on the same pipeline and each thread may be independent of the other (i.e., each has its own instruction sequence). In an embodiment, the threads may statically or dynamically share the transactional tracking mechanism. To guarantee forward progress when dynamically sharing the transactional tracking mechanism, the hardware may delay the operation of some threads or reallocate resources in favor of allowing one or more other threads to have sufficient resources to execute successfully.

In an embodiment, the hardware implementation may have a default fixed size of max(i) and max(j) (e.g., max(j)=1 and max(i)=16) which supports a single outermost transaction active within the pipeline while utilizing the full set of queue entries in order to maximize the transactional depth of the allowed transaction. This default configuration may be static, or may be employed dynamically by the hardware for subsequent transactions after the software hints or hardware predictions for the maximum nesting depth are exceeded.

In an embodiment, a static mapping exists between the transactional queue entry assigned by the hardware for each new transactional level that corresponds to a fixed index which is a combination of (i,j,t). In the fixed index j is not the count of j, but instead is a fixed index relative to the structure, a count of j is maintained separately. Such a static mapping may simplify the logic implementation. In other embodiments, there is no fixed index into the transactional queue based on (i,j,t), but instead, the entries are allocated dynamically. In either case, transactions may be identified by a transactional ID which corresponds to a transactional queue entry.

In an embodiment, the decode and dispatch logic tags dispatched instructions with a transaction depth and transaction ID in order to ensure that the instructions are correctly executed. The decode and dispatch logic additionally restores the queue to the correct nesting depth and ID upon a pipeline flush and updates the effective controls to the correct value for the flushed thread. Each queue entry indicates the outstanding outermost transaction=j; the nesting depth within an outmost transaction=i; the software thread=t; and contains the effective transaction control bits pertaining to the transaction such as which instructions are allowed to execute; how to handle program exceptions encountered within a transaction; etc.

The transactional execution facility introduces a CPU state called the transactional execution (TX) mode. Following a CPU reset, the CPU is not in the TX mode. The CPU enters the TX mode by a TRANSACTION BEGIN instruction. The CPU leaves the TX mode by either (a) an outermost TRANSACTION END instruction (more details on inner and outer to follow), or (b) the transaction being aborted. While in the TX mode, storage accesses by the CPU appear to be block-concurrent as observed by other CPUs and the I/O subsystem. The storage accesses are either (a) committed to storage when the outermost transaction ends without aborting, or (b) discarded if the transaction is aborted.

Transactions may be nested. That is, while the CPU is in the TX mode, it may execute another TRANSACTION BEGIN instruction. The instruction that causes the CPU to enter the TX mode is called the outermost TRANSACTION BEGIN; similarly, the program is said to be in the outermost transaction. Subsequent executions of TRANSACTION BEGIN are called inner instructions; and the program is executing an inner transaction. The model provides a minimum nesting depth and a model-dependent maximum nesting depth. An EXTRACT TRANSACTION NESTING DEPTH instruction returns the current nesting depth value, and in a further embodiment, may return a maximum nesting-depth value. This technique uses a model called "flattened nesting" in which an aborting condition at any nesting depth causes all levels of the transaction to be aborted, and control is returned to the instruction following the outermost TRANSACTION BEGIN.

During processing of a transaction, a transactional access made by one CPU is said to conflict with either (a) a transactional access or nontransactional access made by another CPU, or (b) a nontransactional access made by the I/O subsystem, if both accesses are to any location within the same cache line, and one or both of the accesses is a store. In other words, in order for transactional execution to be productive, the CPU is not to be observed making transactional accesses until it commits. This programming model may be highly effective in certain environments; for example, the updating of two points in a doubly-linked list of a million elements. However, it may be less effective, if there is a lot of contention for the storage locations that are being transactionally accessed.

In one model of transactional execution (referred to herein as a nonconstrained transaction), when a transaction is aborted, the program may either attempt to re-drive the transaction in the hopes that the aborting condition is no longer present, or the program may "fall back" to an equivalent non-transactional path. In another model of transactional execution (referred to herein as a constrained transaction), an aborted transaction is automatically re-driven by the CPU; in the absence of constraint violations, the constrained transaction is assured of eventual completion.

When initiating a transaction, the program may specify various controls, such as (a) which general registers are restored to their original contents if the transaction is aborted, (b) whether the transaction is allowed to modify the floating-point-register context, (c) whether the transaction is allowed to modify access registers (ARs), and (d) whether certain program-exception conditions are to be blocked from causing an interruption. If a nonconstrained transaction is aborted, various diagnostic information may be provided. For instance, the outermost TBEGIN instruction that initiates a nonconstrained transaction may designate a program specified transaction diagnostic block (TDB). Further, the TDB in the CPU's prefix area or designated by the host's state description may also be used if the transaction is aborted due to a program interruption or a condition that causes interpretative execution to end, respectively.

Indicated above are various types of registers. These are further explained in detail herein. General registers may be used as accumulators in general arithmetic and logical operations. In one embodiment, each register contains 64 bit positions, and there are 16 general registers. The general registers are identified by the numbers 0-15, and are designated by a four-bit R field in an instruction. Some instructions provide for addressing multiple general registers by having several R fields. For some instructions, the use of a specific general register is implied rather than explicitly designated by an R field of the instruction.

In addition to their use as accumulators in general arithmetic and logical operations, 15 of the 16 general registers are also used as base address and index registers in address generation. In these cases, the registers are designated by a four-bit B field or X field in an instruction. A value of zero in the B or X field specifies that no base or index is to be applied, and thus, general register 0 is not to be designated as containing a base address or index.

Floating point instructions use a set of floating point registers. The CPU has 16 floating point registers, in one embodiment. The floating point registers are identified by the numbers 0-15, and are designated by a four bit R field in floating point instructions. Each floating point register is 64 bits long and can contain either a short (32-bit) or a long (64-bit) floating point operand.

A floating point control (FPC) register is a 32-bit register that contains mask bits, flag bits, a data exception code, and rounding mode bits, and is used during processing of floating point operations.

Further, in one embodiment, the CPU has 16 control registers, each having 64 bit positions. The bit positions in the registers are assigned to particular facilities in the system, such as Program Event Recording (PER) (discussed below), and are used either to specify that an operation can take place or to furnish special information required by the facility. In one embodiment, for the transactional facility, CR0 (bits 8 and 9) and CR2 (bits 61-63) are used, as described below.

The CPU has, for instance, 16 access registers numbered 0-15. An access register consists of 32 bit positions containing an indirect specification of an address space control element (ASCE). An address space control element is a parameter used by the dynamic address translation (DAT) mechanism to translate references to a corresponding address space. When the CPU is in a mode called the access register mode (controlled by bits in the program status word (PSW)), an instruction B field, used to specify a logical address for a storage operand reference, designates an access register, and the address space control element specified by the access register is used by DAT for the reference being made. For some instructions, an R field is used instead of a B field. Instructions are provided for loading and storing the contents of the access registers and for moving the contents of one access register to another.

Each of access registers 1-15 can designate any address space. Access register 0 designates the primary instruction space. When one of access registers 1-15 is used to designate an address space, the CPU determines which address space is designated by translating the contents of the access register. When access register 0 is used to designate an address space, the CPU treats the access register as designating the primary instruction space, and it does not examine the actual contents of the access register. Therefore, the 16 access registers can designate, at any one time, the primary instruction space and a maximum of 15 other spaces.

In one embodiment, there are multiple types of address spaces. An address space is a consecutive sequence of integer numbers (virtual addresses) together with the specific transformation parameters which allow each number to be associated with a byte location in storage. The sequence starts at zero and proceeds left to right.

In, for instance, the z/Architecture, when a virtual address is used by a CPU to access main storage (a.k.a., main memory), it is first converted, by means of dynamic address translation (DAT), to a real address, and then, by means of prefixing, to an absolute address. DAT may use from one to five levels of tables (page, segment, region third, region second, and region first) as transformation parameters. The designation (origin and length) of the highest-level table for a specific address space is called an address space control element, and it is found for use by DAT in a control register or as specified by an access register. Alternatively, the address space control element for an address space may be a real space designation, which indicates that DAT is to translate the virtual address simply by treating it as a real address and without using any tables.

DAT uses, at different times, the address space control elements in different control registers or specified by the access registers. The choice is determined by the translation mode specified in the current PSW. Four translation modes are available: primary space mode, secondary space mode, access register mode and home space mode. Different address spaces are addressable depending on the translation mode.

At any instant when the CPU is in the primary space mode or secondary space mode, the CPU can translate virtual addresses belonging to two address spaces—the primary address space and the second address space. At any instant when the CPU is in the access register mode, it can translate virtual addresses of up to 16 address spaces—the primary address space and up to 15 AR-specified address spaces. At any instant when the CPU is in the home space mode, it can translate virtual addresses of the home address space.

The primary address space is identified as such because it consists of primary virtual addresses, which are translated by means of the primary address space control element (ASCE). Similarly, the secondary address space consists of secondary virtual addresses translated by means of the secondary ASCE; the AR specified address spaces consist of AR specified virtual addresses translated by means of AR specified ASCEs; and the home address space consists of home virtual addresses translated by means of the home ASCE. The primary and secondary ASCEs are in control registers 1 and 7, respectively. AR specified ASCEs are in ASN-second-table entries that are located through a process called access-register translation (ART) using control register 2, 5, and 8. The home ASCE is in control register 13.

One embodiment of a computing environment to incorporate and use one or more aspects of the present invention, including, but not limited to, one or more aspects of the transactional facility described herein, is described with reference to FIGS. 1A-1B.

Referring to FIG. 1A, in one example, computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-08, $9^{th}$ Edition, August 2010, which is hereby incorporated herein by reference in its entirety.

Z/ARCHITECTURE, IBM, and Z/OS and Z/VM (referenced below) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, one or more central processors 110, one or more partitions 112 (e.g., logical partitions (LP)), a logical partition hypervisor 114, and an I/O subsystem 115, each of which is described below.

Central processors 110 are physical processor resources allocated to the logical partitions. In particular, each logical partition 112 has one or more logical processors, each of which represents all or a share of a physical processor 110 allocated to the partition. The logical processors of a particular partition 112 may be either dedicated to the partition, so that the underlying processor resource 110 is reserved for that partition; or shared with another partition, so that the underlying processor resource is potentially available to another partition.

A logical partition functions as a separate system and has one or more applications, and optionally, a resident operating system therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 112 are managed by a logical partition hypervisor 114, which is implemented by firmware running on processors 110. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The logical partitions and logical partition hypervisor each comprise one or more programs residing in respective partitions of central storage associated with the central processors. One example of logical partition hypervisor 114 is the Processor Resource/System Manager (PR/SM), offered by International Business Machines Corporation, Armonk, N.Y.

As used herein, storage, central storage, main storage, memory and main memory are used interchangeably, unless otherwise noted, implicitly by usage or explicitly. Further, while in one embodiment, a transaction effectively delaying includes delaying committing transaction stores to main memory until completion of a selected transaction; in another embodiment effectively delaying includes allowing transactional updates to memory, but keeping the old values and restoring memory to the old values on abort.

I/O subsystem 115 directs the flow of information between input/output devices 106 and main storage (a.k.a., main memory). It is coupled to the central processing complex, in that it can be a part of the central processing complex or separate therefrom. The I/O subsystem 115 relieves the central processors of the task of communicating directly with the input/output devices and permits data processing to proceed concurrently with input/output processing. To provide communications, the I/O subsystem 115 employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem 115 is referred to herein as a channel subsystem. However, this is only one example. Other types of I/O subsystems can incorporate and use one or more aspects of the present invention.

The I/O subsystem 115 uses one or more input/output paths as communication links in managing the flow of information to or from I/O devices 106. In this particular example, these paths are called channel paths, since the communication adapters are channels.

The computing environment described above is only one example of a computing environment that can incorporate and use one or more aspects of the present invention. Other environments, including but not limited to, non-partitioned environments, other partitioned environments, and/or emulated environments, may incorporate and use one or more aspects of the present invention. Aspects of the invention are not limited to any one environment.

In accordance with one or more aspects of the present invention, the transactional execution facility is a CPU enhancement that provides the means by which the CPU executes a sequence of instructions—known as a transaction—that may access multiple storage locations, including the updating of those locations. As observed by other CPUs and the I/O subsystem, the transaction is either (a) completed in its entirety as a single atomic operation, or (b) aborted, potentially leaving no evidence that it ever executed (except for certain conditions described herein). Thus, a successfully completed transaction can update numerous storage locations without any special locking that is needed in the classic multiprocessing model.

The transactional execution facility includes, for instance, one or more controls; one or more instructions; transactional processing, including constrained and nonconstrained execution; and abort processing, each of which is further described below.

In one embodiment, three special purpose controls, including a transaction abort Program Status Word (PSW), a transaction diagnostic block (TDB) address, and a transaction nesting depth; five control register bits; and six general instructions, including TRANSACTION BEGIN (constrained and nonconstrained), TRANSACTION END, EXTRACT TRANSACTION NESTING DEPTH, and TRANSACTION ABORT, and NONTRANSACTIONAL STORE, are used to control the transactional execution facility. When the facility is installed, it is installed, for instance, in all CPUs in the configuration. A facility indication, bit 73 in one implementation, when set to one, indicates that the transactional execution facility is installed.

When the transactional execution facility is installed, the configuration provides a nonconstrained transactional execution facility, and optionally, a constrained transactional execution facility, each of which is described below. When facility indications 50 and 73, as examples, are both set to one, the constrained transactional execution facility is installed. Both facility indications are stored in memory at specified locations.

As used herein, the instruction name TRANSACTION BEGIN refers to the instructions having the mnemonics TBEGIN (Transaction Begin for a nonconstrained transaction) and TBEGINC (Transaction Begin for a constrained transaction). Discussions pertaining to a specific instruction are indicated by the instruction name followed by the mnemonic in parentheses or brackets, or simply by the mnemonic.

Figure 2A:
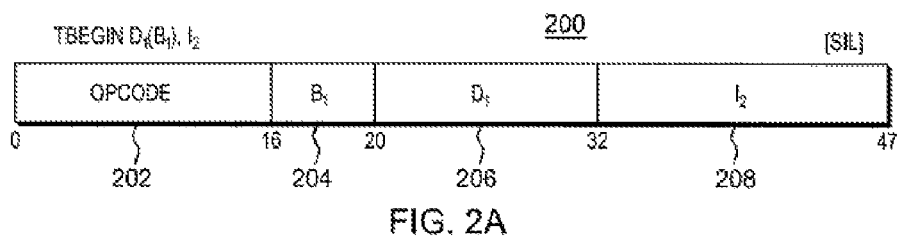
FIG. 2A depicts one example of a Transaction Begin (TBEGIN) instruction used in accordance with an aspect of the present invention.
Figure 2B:
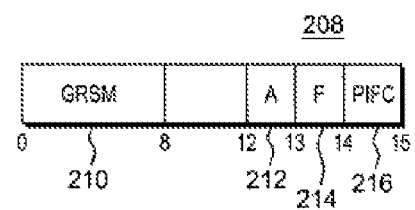
FIG. 2B depicts one embodiment of further details of a field of the TBEGIN instruction of FIG. 2A, in accordance with an aspect of the present invention.

One embodiment of a format of a TRANSACTION BEGIN (TBEGIN) instruction is depicted in FIGS. 2A-2B. As one example, a TBEGIN instruction 200 includes an opcode field 202 that includes an opcode specifying a transaction begin nonconstrained operation; a base field ($B_1$) 204; a displacement field ($D_1$) 206; and an immediate field ($I_2$) 208. When the $B_1$ field 204 is nonzero, the contents of the general register specified by the $B_1$ field 204 are added to $D_1$ 206 to obtain the first operand address.

When the $B_1$ field 204 is nonzero, the following applies:
When the transaction nesting depth is initially zero, the first operand address designates the location of the 256 byte transaction diagnostic block, called the TBEGIN-specified TDB (described further below) into which various diagnostic information may be stored if the transaction is aborted. When the CPU is in the primary space mode or access register mode, the first operand address designates a location in the primary address space. When the CPU is in the secondary space or home space mode, the first operand address designates a location in the secondary or home address space, respectively. When DAT is off, the transaction diagnostic block (TDB) address (TDBA) designates a location in real storage.

Store accessibility to the first operand is determined. If accessible, the logical address of the operand is placed into the transaction diagnostic block address (TDBA), and the TDBA is valid.

When the CPU is already in the nonconstrained transactional execution mode, the TDBA is not modified, and it is unpredictable whether the first operand is tested for accessibility.

When the $B_1$ field 204 is zero, no access exceptions are detected for the first operand and, for the outermost TBEGIN instruction, the TDBA is invalid.

The bits of the $I_2$ field 208 are defined as follows, in one example:

General Register Save Mask (GRSM) 210 (FIG. 2B):
Bits 0-7 of the $I_2$ field 208 contain the general register save mask (GRSM). Each bit of the GRSM represents an even-odd pair of general registers, where bit 0 represents register 0 and 1, bit 1 represents register 2 and 3, and so forth. When a bit in the GRSM of the outermost TBEGIN instruction is zero, the corresponding register pair is not saved. When a bit in the GRSM of the outermost TBEGIN instruction is one, the corresponding register pair is saved in a model dependent location that is not directly accessible by the program.

If the transaction aborts, saved register pairs are restored to their contents when the outermost TBEGIN instruction was executed. The contents of all other (unsaved) general registers are not restored when a transaction aborts.

The general register save mask is ignored on all TBEGINs except for the outermost one.

Allow AR Modification (A) 212:
The A control 212, bit 12 of the $I_2$ field 208, controls whether the transaction is allowed to modify an access register. The effective allow AR modification control is the logical AND of the A control 212 in the TBEGIN instruction for the current nesting level and for all outer levels.

If the effective A control 212 is zero, the transaction will be aborted with abort code 11 (restricted instruction) if an attempt is made to modify any access register. If the effective A control 212 is one, the transaction will not be aborted if an access register is modified (absent of any other abort condition).

Allow Floating Point Operation (F) 214:

The F control 214, bit 13 of the I₂ field 208, controls whether the transaction is allowed to execute specified floating point instructions. The effective allow floating point operation control is the logical AND of the F control 214 in the TBEGIN instruction for the current nesting level and for all outer levels.

If the effective F control 214 is zero, then (a) the transaction will be aborted with abort code 11 (restricted instruction) if an attempt is made to execute a floating point instruction, and (b) the data exception code (DXC) in byte 2 of the floating point control register (FPCR) will not be set by any data exception program exception condition. If the effective F control 214 is one, then (a) the transaction will not be aborted if an attempt is made to execute a floating point instruction (absent any other abort condition), and (b) the DXC in the FPCR may be set by a data exception program exception condition.

Program Interruption Filtering Control (PIFC) 216:

Bits 14-15 of the I₂ field 208 are the program interruption filtering control (PIFC) 216. The PIFC 216 controls whether certain classes of program interruption conditions (e.g., addressing exception, data exception, operation exception, protection exception, etc.) that occur while the CPU is in the transactional execution mode result in an interruption.

The effective PIFC 216 is the highest value of the PIFC 216 in the TBEGIN instruction for the current nesting level and for all outer levels. When the effective PIFC 216 is zero, all program interruption conditions result in an interruption. When the effective PIFC 216 is one, program interruption conditions having a transactional execution class of 1 and 2 result in an interruption. (Each program interruption is assigned at least one transactional execution class, depending on the severity of the exception. Severity is based on the likelihood of recovery during a repeated execution of the transaction, and whether the operating system needs to see the interruption.) When the effective PIFC 216 is two, program interruption conditions having a transactional execution class of 1 result in an interruption. A PIFC 216 value of 3 is reserved.

Bits 8-11 of the I₂ field 208 (bits 40-43 of the instruction) are reserved and should contain zeros; otherwise, the program may not operate compatibly in the future.

Figure 3A:
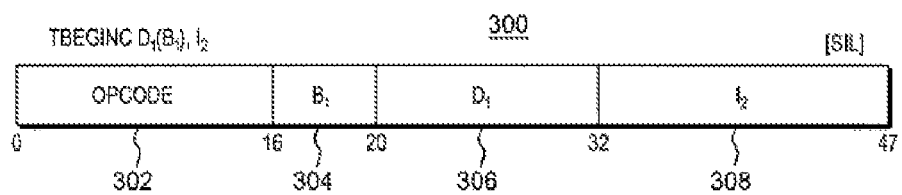
FIG. 3A depicts on example of a Transaction Begin constrained (TBEGINC) instruction used in accordance with an aspect of the present invention.

One embodiment of a format of a Transaction Begin constrained (TBEGINC) instruction is described with reference to FIGS. 3A-3B. In one example, TBEGINC 300 includes an opcode field 302 that includes an opcode specifying a transaction begin constrained operation; a base field (B₁) 304; a displacement field (D₁) 306; and an immediate field (I₂) 308. The contents of the general register specified by B₁ 304 are added to D₁ 306 to obtain the first operand address. However, with the transaction begin constrained instruction, the first operand address is not used to access storage. Instead, the B₁ field of the instruction includes zeros; otherwise, a specification exception is recognized.

Figure 3B:
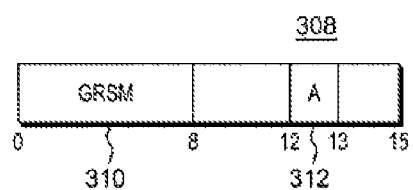
FIG. 3B depicts one embodiment of further details of a field of the TBEGINC instruction of FIG. 3A, in accordance with an aspect of the present invention.

In one embodiment, the I₂ field includes various controls, an example of which is depicted in FIG. 3B.

The bits of the I₂ field 308 are defined as follows, in one example:

General Register Save Mask (GRSM) 310:

Bits 0-7 of the I₂ field 308 contain the general register save mask 310 (GRSM). Each bit of the GRSM 310 represents an even-odd pair of general registers, where bit 0 represents registers 0 and 1, bit 1 represents registers 2 and 3, and so forth. When a bit in the GRSM 310 is zero, the corresponding register pair is not saved. When a bit in the GRSM 310 is one, the corresponding register pair is saved in a model-dependent location that is not directly accessible by the program.

If the transaction aborts, saved register pairs are restored to their contents when the outermost TRANSACTION BEGIN instruction was executed. The contents of all other (unsaved) general registers are not restored when a constrained transaction aborts.

When TBEGINC 300 is used to continue execution in the nonconstrained transaction execution mode, the general register save mask is ignored.

Allow AR Modification (A) 312:

The A control 312, bit 12 of the I₂ field 308, controls whether the transaction is allowed to modify an access register. The effective allow-AR-modification control is the logical AND of the A control in the TBEGINC 300 instruction for the current nesting level and for any outer TBEGIN 200 or TBEGINC 300 instructions.

If the effective A control 312 is zero, the transaction will be aborted with abort code 11 (restricted instruction) if an attempt is made to modify any access register. If the effective A control 312 is one, the transaction will not be aborted if an access register is modified (absent of any other abort condition).

Bits 8-11 and 13-15 of the I₂ field 308 (bits 40-43 and 45-47 of the instruction) are reserved and should contain zeros.

Figure 4:
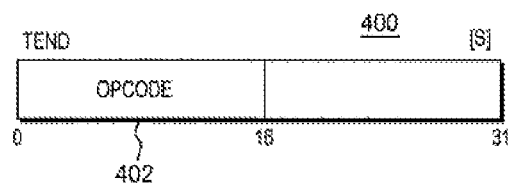
FIG. 4 depicts one example of a Transaction End (TEND) instruction used in accordance with an aspect of the present invention.

The end of a Transaction Begin instruction is specified by a TRANSACTION END (TEND) instruction, a format of which is depicted in FIG. 4. As one example, a TEND instruction 400 includes an opcode field 402 that includes an opcode specifying a transaction end operation.

A number of terms are used with respect to the transactional execution facility, and therefore, solely for convenience, a list of terms is provided below in alphabetical order. In one embodiment, these terms have the following definition:

Abort:

A transaction aborts when it is ended prior to a TRANSACTION END instruction that results in a transaction nesting depth of zero. When a transaction aborts, the following occurs, in one embodiment:

Transactional store accesses made by any and all levels of the transaction are discarded (that is, not committed).

Non-transactional store accesses made by any and all levels of the transaction are committed.

Registers designated by the general register save mask (GRSM) of the outermost TRANSACTION BEGIN instruction are restored to their contents prior to the transactional execution (that is, to their contents at execution of the outermost TRANSACTION BEGIN instruction). General registers not designated by the general register save mask of the outermost TRANSACTION BEGIN instruction are not restored.

Access registers, floating-point registers, and the floating-point control register are not restored. Any changes made to these registers during transaction execution are retained when the transaction aborts.

A transaction may be aborted due to a variety of reasons, including attempted execution of a restricted instruction, attempted modification of a restricted resource, transactional conflict, exceeding various CPU resources, any interpretive-execution interception condition, any interruption, a TRANSACTION ABORT instruction, and other reasons. A transaction-abort code provides specific reasons why a transaction may be aborted.

Figure 5:
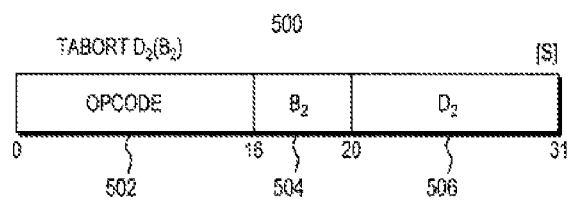
FIG. 5 depicts one example of a Transaction Abort (TABORT) instruction used in accordance with an aspect of the present invention.

One example of a format of a TRANSACTION ABORT (TABORT) instruction is described with reference to FIG. 5. As one example, a TABORT instruction 500 includes an opcode field 502 that includes an opcode specifying a transaction abort operation; a base field ($B_2$) 504; and a displacement field ($D_2$) 506. When the $B_2$ field 504 is nonzero, the contents of the general register specified by $B_2$ field 504 are added to $D_2$ 506 to obtain a second operand address; otherwise, the second operand address is formed solely from the $D_2$ field 506, and the $B_2$ field 504 is ignored. The second operand address is not used to address data; instead, the address forms the transaction abort code which is placed in a transaction diagnostic block during abort processing. Address computation for the second operand address follows the rules of address arithmetic; in the 24-bit addressing mode, bits 0-29 are set to zeros; in the 31-bit addressing mode, bits 0-32 are set to zeros.

Commit:

At the completion of an outermost TRANSACTION END instruction, the CPU commits the store accesses made by the transaction such that they are visible to other CPUs and the I/O subsystem. As observed by other CPUs and by the I/O subsystem, all fetch and store accesses made by all nested levels of the transaction appear to occur as a single concurrent operation when the commit occurs.

The contents of the general registers, access registers, floating-point registers, and the floating-point control register are not modified by the commit process. Any changes made to these registers during transactional execution are retained when the transaction's stores are committed.

Conflict:

A transactional access made by one CPU conflicts with either (a) a transactional access or non-transactional access made by another CPU, or (b) the non-transactional access made by the I/O subsystem, if both accesses are to any location within the same cache line, and one or more of the accesses is a store.

A conflict may be detected by a CPU's speculative execution of instructions, even though the conflict may not be detected in the conceptual sequence.

Constrained Transaction:

A constrained transaction is a transaction that executes in the constrained transactional execution mode and is subject to the following limitations:

A subset of the general instructions is available.
A limited number of instructions may be executed.
A limited number of storage-operand locations may be accessed.
The transaction is limited to a single nesting level.

In the absence of repeated interruptions or conflicts with other CPUs or the I/O subsystem, a constrained transaction eventually completes, thus an abort-handler routine is not required. Constrained transactions are described in detail below.

When a TRANSACTION BEGIN constrained (TBEGINC) instruction is executed while the CPU is already in the nonconstrained transaction execution mode, execution continues as a nested nonconstrained transaction.

Constrained Transactional Execution Mode:

When the transaction nesting depth is zero, and a transaction is initiated by a TBEGINC instruction, the CPU enters the constrained transactional execution mode. While the CPU is in the constrained transactional execution mode, the transaction nesting depth is one.

Nested Transaction:

When the TRANSACTION BEGIN instruction is issued while the CPU is in the nonconstrained transactional execution mode, the transaction is nested.

The transactional execution facility uses a model called flattened nesting. In the flattened nesting mode, stores made by an inner transaction are not observable by other CPUs and by the I/O subsystem until the outermost transaction commits its stores. Similarly, if a transaction aborts, all nested transactions abort, and all transactional stores of all nested transactions are discarded.

Figure 6:
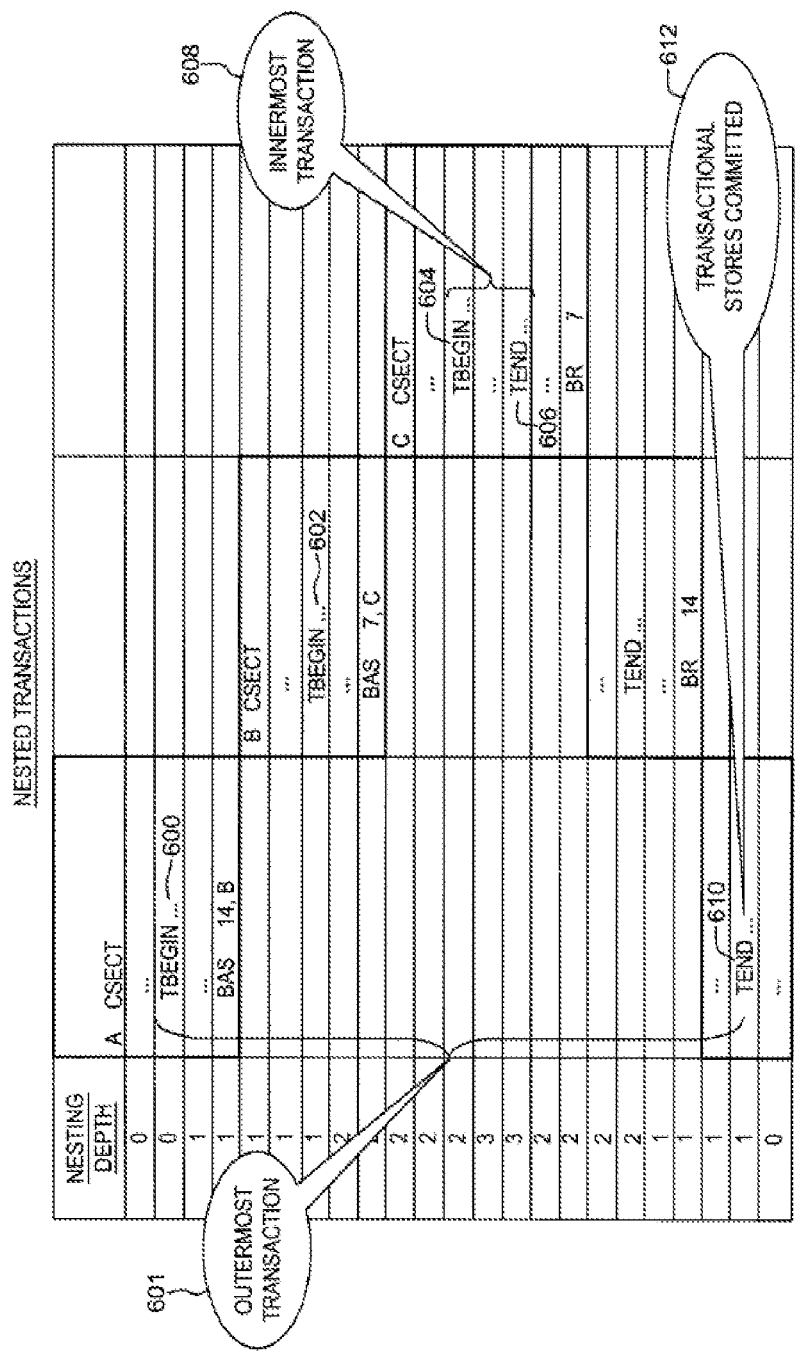
FIG. 6 depicts one example of nested transactions, in accordance with an aspect of the present invention.

One example of nested transactions is depicted in FIG. 6. As shown, a first TBEGIN 600 starts an outermost transaction 601, TBEGIN 602 starts a first nested transaction, and TBEGIN 604 starts a second nested transaction. In this example, TBEGIN 604 and TEND 606 define an innermost transaction 608. When TEND 610 executes, transactional stores are committed 612.

Nonconstrained Transaction:

A nonconstrained transaction is a transaction that executes in the nonconstrained transactional execution mode. Although a nonconstrained transaction is not limited in the manner as a constrained transaction, it may still be aborted due to a variety of causes.

Nonconstrained Transactional Execution Mode:

When a transaction is initiated by the TBEGIN instruction, the CPU enters the nonconstrained transactional execution mode. While the CPU is in the nonconstrained transactional execution mode, the transaction nesting depth may vary from one to the maximum transaction nesting depth.

Non-Transactional Access:

Non-transactional accesses are storage operand accesses made by the CPU when it is not in the transactional execution mode (that is, classic storage accesses outside of a transaction). Further, accesses made by the I/O subsystem are non-transactional accesses. Additionally, the NONTRANSACTIONAL STORE instruction may be used to cause a non-transactional store access while the CPU is in the nonconstrained transactional execution mode.

Figure 7:
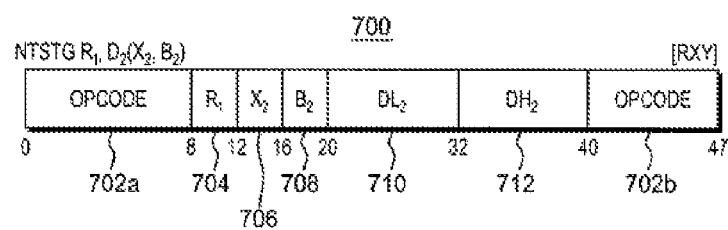
FIG. 7 depicts one example of a NONTRANSACTIONAL STORE (NTSTG) instruction used in accordance with an aspect of the present invention.

One embodiment of a format of a NONTRANSACTIONAL STORE instruction is described with reference to FIG. 7. As one example, a NONTRANSACTIONAL STORE instruction 700 includes a plurality of opcode fields 702a, 702b specifying an opcode that designates a nontransactional store operation; a register field 704, the contents of which are called the first operand; an index field ($X_2$) 706; a base field ($B_2$) 708; a first displacement field ($DL_2$) 710; and a second displacement field ($DH_2$) 712. The contents of the general registers designated by the $X_2$ and $B_2$ fields are added to the contents of a concatenation of the $DH_2$ 712 and $DL_2$ 710 fields to form the second operand address. When either or both the $X_2$ 706 or $B_2$ 708 fields are zero, the corresponding register does not take part in the addition.

The 64 bit first operand is nontransactionally placed unchanged at the second operand location.

The displacement, formed by the concatenation of the $DH_2$ 712 and $DL_2$ 710 fields, is treated as a 20-bit signed binary integer.

The second operand is to be aligned on a double word boundary; otherwise a specification exception is recognized and the operation is suppressed.

Outer/Outermost Transaction:

A transaction with a lower-numbered transaction nesting depth is an outer transaction. A transaction with a transaction nesting depth value of one is the outermost transaction.

An outermost TRANSACTION BEGIN instruction is one that is executed when the transaction nesting depth is initially zero. An outermost TRANSACTION END instruction is one that causes the transaction nesting depth to transition from one to zero. A constrained transaction is the outermost transaction, in this embodiment.

Program-Interruption Filtering:

When a transaction is aborted due to certain program-interruption conditions, the program can optionally prevent the interruption from occurring. This technique is called program-interruption filtering. Program-interruption filtering is subject to the transactional class of the interruption, the effective program-interruption-filtering control from the TRANSACTION BEGIN instruction, and the transactional execution program-interruption-filtering override in control register 0.

Transaction:

A transaction includes the storage-operand accesses made, and selected general registers altered, while the CPU is in the transaction execution mode. For a nonconstrained transaction, storage-operand accesses may include both transactional accesses and non-transactional accesses. For a constrained transaction, storage-operand accesses are limited to transactional accesses. As observed by other CPUs and by the I/O subsystem, all storage-operand accesses made by the CPU while in the transaction execution mode appear to occur as a single concurrent operation. If a transaction is aborted, transactional store accesses are discarded, and any registers designated by the general register save mask of the outermost TRANSACTION BEGIN instruction are restored to their contents prior to transactional execution.

Transactional Accesses:

Transactional accesses are storage operand accesses made while the CPU is in the transactional execution mode, with the exception of accesses made by the NONTRANSACTIONAL STORE instruction.

Transactional Execution Mode:

The term transactional execution mode (a.k.a., transaction execution mode) describes the common operation of both the nonconstrained and the constrained transactional execution modes. Thus, when the operation is described, the terms nonconstrained and constrained are used to qualify the transactional execution mode.

When the transaction nesting depth is zero, the CPU is not in the transactional execution mode (also called the non-transactional execution mode).

As observed by the CPU, fetches and stores made in the transactional execution mode are no different than those made while not in the transactional execution mode.

In one embodiment of the z/Architecture, the transactional execution facility is under the control of bits 8-9 of control register 0, bits 61-63 of control register 2, the transaction nesting depth, the transaction diagnostic block address, and the transaction abort program status word (PSW).

Following an initial CPU reset, the contents of bit positions 8-9 of control register 0, bit positions 62-63 of control register 2, and the transaction nesting depth are set to zero. When the transactional execution control, bit 8 of control register 0, is zero, the CPU cannot be placed into the transactional execution mode.

Further details regarding the various controls are described below.

As indicated, the transactional execution facility is controlled by two bits in control register zero and three bits in control register two. For instance:

Control Register 0 Bits:

The bit assignments are as follows, in one embodiment:

Transactional Execution Control (TXC): Bit 8 of control register zero is the transactional execution control. This bit provides a mechanism whereby the control program (e.g., operating system) can indicate whether or not the transactional execution facility is usable by the program. Bit 8 is set to one to successfully enter the transactional execution mode.

When bit 8 of control register 0 is zero, attempted execution of the EXTRACT TRANSACTION NESTING DEPTH, TRANSACTION BEGIN and TRANSACTION END instructions results in a special operation execution.

Figure 8:
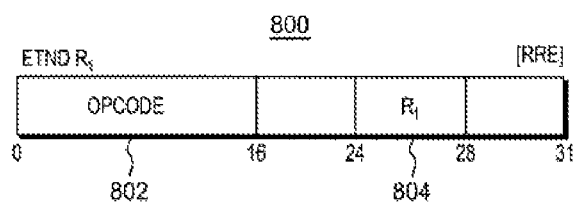
FIG. 8 depicts one example of an EXTRACT TRANSACTION NESTING DEPTH (ETND) instruction used in accordance with an aspect of the present invention.

One embodiment of a format of an EXTRACT TRANSACTION NESTING DEPTH instruction is described with reference to FIG. 8. As one example, an EXTRACT TRANSACTION NESTING DEPTH instruction 800 includes an opcode field 802 specifying an opcode that indicates the extract transaction nesting depth instruction; and a register field $R_1$ 804 that designates a general register.

The current transaction nesting depth is placed in bits 48-63 of general register $R_1$ 804. Bits 0-31 of the register remain unchanged, and bits 32-47 of the register are set to zero.

In a further embodiment, the maximum transaction nesting depth is also placed in general register $R_1$ 804, such as in bits 16-31.

Transaction Execution Program Interruption Filtering Override (PIFO): Bit 9 of control register zero is the transactional execution program interruption filtering override. This bit provides a mechanism by which the control program can ensure that any program interruption condition that occurs while the CPU is in the transactional execution mode results in an interruption, regardless of the effective program interruption filtering control specified or implied by the TRANSACTION BEGIN instruction(s).

Control Register 2 Bits:

The assignments are as follows, in one embodiment:

Transaction Diagnostic Scope (TDS): Bit 61 of control register 2 controls the applicability of the transaction diagnosis control (TDC) in bits 62-63 of the register, as follows:

| TDS | |
|---|---|
| Value | Meaning |
| 0 | The TDC applies regardless of whether the CPU is in the problem or supervisor state. |
| 1 | The TDC applies only when the CPU is in the problem state. When the CPU is in the supervisor state, processing is as if the TDC contained zero. |

Transaction Diagnostic Control (TDC): Bits 62-63 of control register 2 are a 2-bit unsigned integer that may be used to cause transactions to be randomly aborted for diagnostic purposes. The encoding of the TDC is as follows, in one example:

| TDS | |
|---|---|
| Value | Meaning |
| 0 | Normal operation; transactions are not aborted as a result of the TDC. |
| 1 | Abort every transaction at a random instruction, but before execution of the outermost TRANSACTION END instruction. |
| 2 | Abort random transactions at a random instruction. |
| 3 | Reserved |

When a transaction is aborted due to a nonzero TDC, then either of the following may occur:

The abort code is set to any of the codes 7-11, 13-16, or 255, with the value of the code randomly chosen by the CPU; the condition code is set corresponding to the abort code. Abort codes are further described below.

For a nonconstrained transaction, the condition code is set to one. In this case, the abort code is not applicable.

It is model dependent whether TDC value 1 is implemented. If not implemented, a value of 1 acts as if 2 was specified.

For a constrained transaction, a TDC value of 1 is treated as if a TDC value of 2 was specified.

If a TDC value of 3 is specified, the results are unpredictable.

Transaction Diagnostic Block Address (TDBA)

A valid transaction diagnostic block address (TDBA) is set from the first operand address of the outermost TRANSACTION BEGIN (TBEGIN) instruction when the $B_1$ field of the instruction is nonzero. When the CPU is in the primary space or access register mode, the TDBA designates a location in the primary address space. When the CPU is in the secondary space, or home space mode, the TDBA designates a location in the secondary or home address space, respectively. When DAT (Dynamic Address Translation) is off, the TDBA designates a location in real storage.

The TDBA is used by the CPU to locate the transaction diagnostic block—called the TBEGIN-specified TDB—if the transaction is subsequently aborted. The rightmost three bits of the TDBA are zero, meaning that the TBEGIN-specified TDB is on a doubleword boundary.

When the $B_1$ field of an outermost TRANSACTION BEGIN (TBEGIN) instruction is zero, the transactional diagnostic block address is invalid, and no TBEGIN-specified TDB is stored if the transaction is subsequently aborted.

Transaction Abort PSW (TAPSW)

During execution of the TRANSACTION BEGIN (TBEGIN) instruction when the nesting depth is initially zero, the transaction-abort PSW is set to the contents of the current PSW; and the instruction address of the transaction abort PSW designates the next sequential instruction (that is, the instruction following the outermost TBEGIN). During execution of the TRANSACTION BEGIN constrained (TBEGINC) instruction when the nesting depth is initially zero, the transaction abort PSW is set to the contents of the current PSW, except that the instruction address of the transaction abort PSW designates the TBEGINC instruction (rather than the next sequential instruction following the TBEGINC).

When a transaction is aborted, the condition code in the transaction-abort PSW is replaced with a code indicating the severity of the abort condition. Subsequently, if the transaction was aborted due to causes that do not result in an interruption, the PSW is loaded from the transaction abort PSW; if the transaction was aborted due to causes that result in an interruption, the transaction abort PSW is stored as the interruption old PSW.

The transaction abort PSW is not altered during the execution of any inner TRANSACTION BEGIN instruction.

Transaction Nesting Depth (TND)

The transaction nesting depth is, for instance, a 16-bit unsigned value that is incremented each time a TRANSACTION BEGIN instruction is completed with condition code 0 and decremented each time a TRANSACTION END instruction is completed. The transaction nesting depth is reset to zero when a transaction is aborted or by CPU reset.

In one embodiment, a maximum TND of 15 is implemented.

In one implementation, when the CPU is in the constrained transactional execution mode, the transaction nesting depth is one. Additionally, although the maximum TND can be represented as a 4-bit value, the TND is defined to be a 16-bit value to facilitate its inspection in the transaction diagnostic block.

Transaction Diagnostic Block (TDB)

When a transaction is aborted, various status information may be saved in a transaction diagnostic block (TDB), as follows:

1. TBEGIN-Specified TDB:

For a nonconstrained transaction, when the $B_1$ field of the outermost TBEGIN instruction is nonzero, the first operand address of the instruction designates the TBEGIN-specified TDB. This is an application program specified location that may be examined by the application's abort handler.

2. Program-Interruption (PI) TDB:

If a nonconstrained transaction is aborted due to a nonfiltered program exception condition, or if a constrained transaction is aborted due to any program exception condition (that is, any condition that results in a program interruption being recognized), the PI-TDB is stored into locations in the prefix area. This is available for the operating system to inspect and log any diagnostic reporting that it may provide.

3. Interception TDB:

If the transaction is aborted due to any program exception condition that results in interception (that is, the condition causes interpretive execution to end and control to return to the host program), a TDB is stored into a location specified in the state description block for the guest operating system.

The TBEGIN-specified TDB is only stored, in one embodiment, when the TDB address is valid (that is, when the outermost TBEGIN instruction's $B_1$ field is nonzero).

For aborts due to unfiltered program exception conditions, only one of either the PI-TDB or Interception TDB will be stored. Thus, there may be zero, one, or two TDBs stored for an abort.

Further details regarding one example of each of the TDBs are described below:

TBEGIN-Specified TDB:

The 256-byte location specified by a valid transaction diagnostic block address. When the transaction diagnostic block address is valid, the TBEGIN-specified TDB is stored on a transaction abort. The TBEGIN-specified TDB is subject to all storage protection mechanisms that are in effect at the execution of the outermost TRANSACTION BEGIN instruction. A PER (Program Event Recording) storage alteration event for any portion of the TBEGIN-specified TDB is detected during the execution of the outermost TBEGIN, not during the transaction abort processing.

One purpose of PER is to assist in debugging programs. It permits the program to be alerted to the following types of events, as examples:

- Execution of a successful branch instruction. The option is provided of having an event occur only when the branch target location is within the designated storage area.
- Fetching of an instruction from the designated storage area.
- Alteration of the contents of the designated storage area. The option is provided of having an event occur only when the storage area is within designated address spaces.
- Execution of a STORE USING REAL ADDRESS instruction.
- Execution of the TRANSACTION END instruction.

The program can selectively specify that one or more of the above types of events be recognized, except that the event for STORE USING REAL ADDRESS can be specified only along with the storage alteration event. The information concerning a PER event is provided to the program by means of a program interruption, with the cause of the interruption being identified in the interruption code.

When the transaction diagnostic block address is not valid, a TBEGIN-specified TDB is not stored.

Program-Interruption TDB:

Real locations 6,144-6,399 (1800-18FF hex). The program interruption TDB is stored when a transaction is aborted due to program interruption. When a transaction is aborted due to other causes, the contents of the program interruption TDB are unpredictable.

The program interruption TDB is not subject to any protection mechanism. PER storage alteration events are not detected for the program interruption TDB when it is stored during a program interruption.

Interception TDB:

The 256-byte host real location specified by locations 488-495 of the state description. The interception TDB is stored when an aborted transaction results in a guest program interruption interception (that is, interception code 8). When a transaction is aborted due to other causes, the contents of the interception TDB are unpredictable. The interception TDB is not subject to any protection mechanism.

Figure 9:
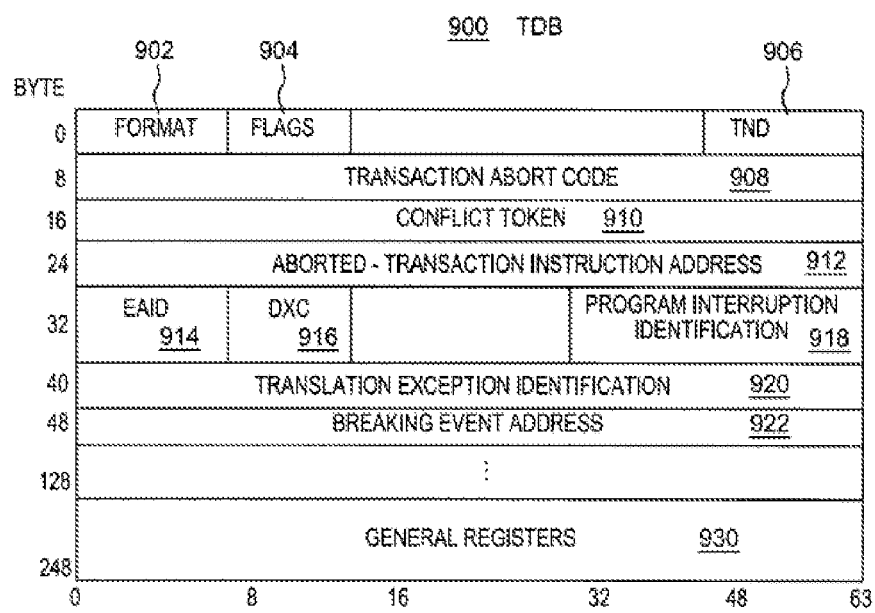
FIG. 9 depicts one example of a transaction diagnostic block used in accordance with an aspect of the present invention.

As depicted in FIG. 9, the fields of a transaction diagnostic block 900 are as follows, in one embodiment:

Format 902: Byte 0 contains a validity and format indication, as follows:

| Value | Meaning |
| --- | --- |
| 0 | The remaining fields of the TDB are unpredictable. |
| 1 | A format-1 TDB, the remaining fields of which are described below. |
| 2-255 | Reserved |

A TDB in which the format field 902 is zero is referred to as a null TDB.

Flags 904: Byte 1 contains various indications, as follows:

Conflict Token Validity (CTV): When a transaction is aborted due to a fetch or store conflict (that is, abort codes 9 or 10, respectively), bit 0 of byte 1 is the conflict token validity indication. When the CTV indication is one, the conflict token 910 in bytes 16-23 of the TDB contain the logical address at which the conflict was detected. When the CTV indication is zero, bytes 16-23 of the TDB are unpredictable.

When a transaction is aborted due to any reason other than a fetch or store conflict, bit 0 of byte 1 is stored as zero.

Constrained-Transaction Indication (CTI): When the CPU is in the constrained transactional execution mode, bit 1 of byte 1 is set to one. When the CPU is in the nonconstrained transactional execution mode, bit 1 of byte 1 is set to zero.

Reserved: Bits 2-7 of byte 1 are reserved, and stored as zeros.

Transaction Nesting Depth (TND) 906: Bytes 6-7 contain the transaction nesting depth when the transaction was aborted.

Transaction Abort Code (TAC) 908: Bytes 8-15 contain a 64-bit unsigned transaction abort code. Each code point indicates the reason for a transaction having been aborted.

It is model dependent whether the transaction abort code is stored in the program interruption TDB when a transaction is aborted due to conditions other than a program interruption.

Conflict Token 910: For transactions that are aborted due to fetch or store conflict (that is, abort codes 9 and 10, respectively), bytes 16-23 contain the logical address of the storage location at which the conflict was detected. The conflict token is meaningful when the CTV bit, bit 0 of byte 1, is one.

When the CTV bit is zero, bytes 16-23 are unpredictable.

Because of speculative execution by the CPU, the conflict token may designate a storage location that would not necessarily be accessed by the transaction's conceptual execution sequence.

Aborted Transaction Instruction Address (ATIA) 912: Bytes 24-31 contain an instruction address that identifies the instruction that was executing when an abort was detected. When a transaction is aborted due to abort codes 2, 5, 6, 11, 13, or 256 or higher, or when a transaction is aborted due to abort codes 4 or 13 and the program exception condition is nullifying, the ATIA points directly to the instruction that was being executed. When a transaction is aborted due to abort codes 4 or 12, and the program exception condition is not nullifying, the ATIA points past the instruction that was being executed.

When a transaction is aborted due to abort codes 7-10, 14-16, or 255, the ATIA does not necessarily indicate the exact instruction causing the abort, but may point to an earlier or later instruction within the transaction.

If a transaction is aborted due to an instruction that is the target of an execute-type instruction, the ATIA identifies the execute-type instruction, either pointing to the instruction or past it, depending on the abort code as described above. The ATIA does not indicate the target of the execute-type instruction.

The ATIA is subject to the addressing mode when the transaction is aborted. In the 24-bit addressing mode, bits 0-40 of the field contain zeros. In the 31-bit addressing mode, bits 0-32 of the field contain zeros.

It is model dependent whether the aborted transaction instruction address is stored in the program interruption TDB when a transaction is aborted due to conditions other than a program interruption.

When a transaction is aborted due to abort code 4 or 12, and the program exception condition is not nullifying, the ATIA does not point to the instruction causing the abort. By subtracting the number of halfwords indicated by the interruption length code (ILC) from the ATIA, the instruction causing the abort may be identified in conditions that are suppressing or terminating, or for non-PER events that are completing. When a transaction is aborted due to a PER event, and no other program exception condition is present, the ATIA is unpredictable.

When the transaction diagnostic block address is valid, the ILC may be examined in program interruption identification (PIID) in bytes 36-39 of the TBEGIN-specified TDB. When filtering does not apply, the ILC may be examined in the PIID at location 140-143 in real storage.

Exception Access Identification (EAID) 914: For transactions that are aborted due to certain filtered program interruption conditions, byte 32 of the TBEGIN-specified TDB contains the exception access identification. In one example, the format of the EAID, and the cases for which it is stored, are the same as those described in real location 160 when the exception condition results in an interruption, as described in the above-incorporated by reference Principles of Operation.

For transactions that are aborted for other reasons, including any exception conditions that result in a program interruption, byte 32 is unpredictable. Byte 32 is unpredictable in the program interruption TDB.

This field is stored only in the TDB designated by the transaction diagnostic block address; otherwise, the field is reserved. The EAID is stored only for access list controlled or DAT protection, ASCE-type, page translation, region first translation, region second translation, region third translation, and segment translation program interruption conditions.

Data Exception Code (DXC) 916: For transactions that are aborted due to filtered data exception program exception conditions, byte 33 of the TBEGIN specified TDB contains the data exception code. In one example, the format of the DXC, and the cases for which it is stored, are the same as those described in real location 147 when the exception condition results in an interruption, as described in the above-incorporated by reference Principles of Operation. In one example, location 147 includes the DXC.

For transactions that are aborted for other reasons, including any exception conditions that result in a program interruption, byte 33 is unpredictable. Byte 33 is unpredictable in the program interruption TDB.

This field is stored only in the TDB designated by the transaction diagnostic block address; otherwise, the field is reserved. The DXC is stored only for data program exception conditions.

Program Interruption Identification (PIID) 918: For transactions that are aborted due to filtered program interruption conditions, bytes 36-39 of the TBEGIN-specified TDB contain the program interruption identification. In one example, the format of the PIID is the same as that described in real locations 140-143 when the condition results in an interruption (as described in the above-incorporated by reference Principles of Operation), except that the instruction length code in bits 13-14 of the PIID is respective to the instruction at which the exception condition was detected.

For transactions that are aborted for other reasons, including exception conditions that result in a program interruption, bytes 36-39 are unpredictable. Bytes 36-39 are unpredictable in the program interruption TDB.

This field is stored only in the TDB designated by the transaction diagnostic block address; otherwise, the field is reserved. The program interruption identification is only stored for program interruption conditions.

Translation Exception Identification (TEID) 920: For transactions that are aborted due to any of the following filtered program interruption conditions, bytes 40-47 of the TBEGIN-specified TDB contain the translation exception identification.

Access list controlled or DAT protection
ASCE-type
Page translation
Region-first translation
Region-second translation
Region-third translation
Segment translation exception In one example, the format of the TEID is the same as that described in real locations 168-175 when the condition results in an interruption, as described in the above-incorporated by reference Principles of Operation.

For transactions that are aborted for other reasons, including exception conditions that result in a program interruption, bytes 40-47 are unpredictable. Bytes 40-47 are unpredictable in the program interruption TDB.

This field is stored only in the TDB designated by the transaction diagnostic block address; otherwise, the field is reserved.

Breaking Event Address 922: For transactions that are aborted due to filtered program interruption conditions, bytes 48-55 of the TBEGIN-specified TDB contain the breaking event address. In one example, the format of the breaking event address is the same as that described in real locations 272-279 when the condition results in an interruption, as described in the above-incorporated by reference Principles of Operation.

For transactions that are aborted for other reasons, including exception conditions that result in a program interruption, bytes 48-55 are unpredictable. Bytes 48-55 are unpredictable in the program interruption TDB.

This field is stored only in the TDB designated by the transaction diagnostic block address; otherwise, the field is reserved.

General Registers 930: Bytes 128-255 contain the contents of general registers 0-15 at the time the transaction was aborted. The registers are stored in ascending order, beginning with general register 0 in bytes 128-135, general register 1 in bytes 136-143, and so forth.

Reserved: All other fields are reserved. Unless indicated otherwise, the contents of reserved fields are unpredictable.

As observed by other CPUs and the I/O subsystem, storing of the TDB(s) during a transaction abort is a multiple access reference occurring after any non-transactional stores.

A transaction may be aborted due to causes that are outside the scope of the immediate configuration in which it executes. For example, transient events recognized by a hypervisor (such as LPAR or z/VM) may cause a transaction to be aborted.

The information provided in the transaction diagnostic block is intended for diagnostic purposes and is substantially correct. However, because an abort may have been caused by an event outside the scope of the immediate configuration, information such as the abort code or program interruption identification may not accurately reflect conditions within the configuration, and thus, should not be used in determining program action.

In addition to the diagnostic information saved in the TDB, when a transaction is aborted due to any data exception program interruption condition and both the AFP register control, bit 45 of control register 0, and the effective allow floating point operation control (F) are one, the data exception code (DXC) is placed into byte 2 of the floating point control register (FPCR), regardless of whether filtering applies to the program interruption condition. When a transaction is aborted, and either or both the AFP register control or effective allow floating point operation control are zero, the DXC is not placed into the FPCR.

In one embodiment, as indicated herein, when the transactional execution facility is installed, the following general instructions are provided.

EXTRACT TRANSACTION NESTING DEPTH
NONTRANSACTIONAL STORE
TRANSACTION ABORT
TRANSACTION BEGIN
TRANSACTION END

When the CPU is in the transactional execution mode, attempted execution of certain instructions is restricted and causes the transaction to be aborted.

When issued in the constrained transactional execution mode, attempted execution of restricted instructions may also result in a transaction constraint program interruption, or may result in execution proceeding as if the transaction was not constrained.

In one example of the z/Architecture, restricted instructions include, as examples, the following non-privileged instructions: COMPARE AND SWAP AND STORE; MODIFY RUNTIME INSTRUMENTATION CONTROLS; PERFORM LOCKED OPERATION; PREFETCH DATA (RELATIVE LONG), when the code in the $M_1$ field is 6 or 7; STORE CHARACTERS UNDER MASK HIGH, when the $M_3$ field is zero and the code in the $R_1$ field is 6 or 7; STORE FACILITY LIST EXTENDED; STORE RUNTIME INSTRUMENTATION CONTROLS; SUPERVISOR CALL; and TEST RUNTIME INSTRUMENTATION CONTROLS.

Under the conditions listed below, the following instructions are restricted:

BRANCH AND LINK (BALR), BRANCH AND SAVE (BASR), and BRANCH AND SAVE AND SET MODE, when the $R_2$ field of the instruction is nonzero and branch tracing is enabled.

BRANCH AND SAVE AND SET MODE and BRANCH AND SET MODE, when the $R_2$ field is nonzero and mode tracing is enabled; SET ADDRESSING MODE, when mode tracing is enabled.

MONITOR CALL, when a monitor event condition is recognized.

When the CPU is in the transactional execution mode, it is model dependent whether the following instructions are restricted: CIPHER MESSAGE; CIPHER MESSAGE WITH CFB; CIPHER MESSAGE WITH CHAINING; CIPHER MESSAGE WITH COUNTER; CIPHER MESSAGE WITH OFB; COMPRESSION CALL; COMPUTE INTERMEDIATE MESSAGE DIGEST; COMPUTE LAST MESSAGE DIGEST; COMPUTE MESSAGE AUTHENTICATION CODE; CONVERT UNICODE-16 TO UNICODE-32; CONVERT UNICODE-16 TO UNICODE-8; CONVERT UNICODE-32 TO UNICODE-16; CONVERT UNICODE-32 TO UNICODE 8; CONVERT UNICODE-8 TO UNICODE-16; CONVERT UNICODE-8 TO UNICODE-32; PERFORM CRYPTOGRAPHIC COMPUTATION; RUNTIME INSTRUMENTATION OFF; and RUNTIME INSTRUMENTATION ON.

When the effective allow AR modification (A) control is zero, the following instructions are restricted: COPY ACCESS; LOAD ACCESS MULTIPLE; LOAD ADDRESS EXTENDED; and SET ACCESS.

When the effective allow floating point operation (F) control is zero, floating point instructions are restricted.

Under certain circumstances, the following instructions may be restricted: EXTRACT CPU TIME; EXTRACT PSW; STORE CLOCK; STORE CLOCK EXTENDED; and STORE CLOCK FAST.

When a nonconstrained transaction is aborted because of the attempted execution of a restricted instruction, the transaction abort code in the transaction diagnostic block is set to 11 (restricted instruction), and the condition code is set to 3, except as follows: when a nonconstrained transaction is aborted due to the attempted execution of an instruction that would otherwise result in a privileged operation exception, it is unpredictable whether the abort code is set to 11 (restricted instruction) or 4 (unfiltered program interruption resulting from the recognition of the privileged operation program interruption). When a nonconstrained transaction is aborted due to the attempted execution of PREFETCH DATA (RELATIVE LONG) when the code in the $M_1$ field is 6 or 7 or STORE CHARACTERS UNDER MASK HIGH when the $M_3$ field is zero and the code in the $R_1$ field is 6 or 7, it is unpredictable whether the abort code is set to 11 (restricted instruction) or 16 (cache other). When a nonconstrained transaction is aborted due to the attempted execution of MONITOR CALL, and both a monitor event condition and a specification exception condition are present it is unpredictable whether the abort code is set to 11 or 4, or, if the program interruption is filtered, 12.

Additional instructions may be restricted in a constrained transaction. Although these instructions are not currently defined to be restricted in a nonconstrained transaction, they may be restricted under certain circumstances in a nonconstrained transaction on future processors.

Certain restricted instructions may be allowed in the transactional execution mode on future processors. Therefore, the program should not rely on the transaction being aborted due to the attempted execution of a restricted instruction. The TRANSACTION ABORT instruction should be used to reliably cause a transaction to be aborted.

In a nonconstrained transaction, the program should provide an alternative non-transactional code path to accommodate a transaction that aborts due to a restricted instruction.

In operation, when the transaction nesting depth is zero, execution of the TRANSACTION BEGIN (TBEGIN) instruction resulting in condition code zero causes the CPU to enter the nonconstrained transactional execution mode. When the transaction nesting depth is zero, execution of the TRANSACTION BEGIN constrained (TBEGINC) instruction resulting in condition code zero causes the CPU to enter the constrained transactional execution mode.

Except where explicitly noted otherwise, all rules that apply for non-transactional execution also apply to transactional execution. Below are additional characteristics of processing while the CPU is in the transactional execution mode.

When the CPU is in the nonconstrained transactional execution mode, execution of the TRANSACTION BEGIN instruction resulting in condition code zero causes the CPU to remain in the nonconstrained transactional execution mode.

As observed by the CPU, fetches and stores made in the transaction execution mode are no different than those made while not in the transactional execution mode. As observed by other CPUs and by the I/O subsystem, all storage operand accesses made while a CPU is in the transactional execution mode appear to be a single block concurrent access. That is, the accesses to all bytes within a halfword, word, doubleword, or quadword are specified to appear to be block concurrent as observed by other CPUs and I/O (e.g., channel) programs. The halfword, word, doubleword, or quadword is referred to in this section as block. When a fetch-type reference is specified to appear to be concurrent within a block, no store access to the block by another CPU or I/O program is permitted during the time that bytes contained in the block are being fetched. When a store-type reference is specified to appear to be concurrent within a block, no access to the block, either fetch or store, is permitted by another CPU or I/O program during the time that the bytes within the block are being stored.

Storage accesses for instruction and DAT and ART (Access Register Table) table fetches follow the non-transactional rules.

The CPU leaves the transactional execution mode normally by means of a TRANSACTION END instruction that causes the transaction nesting depth to transition to zero, in which case, the transaction completes.

When the CPU leaves the transactional execution mode by means of the completion of a TRANSACTION END instruction, all stores made while in the transactional execution mode are committed; that is, the stores appear to occur as a single block-concurrent operation as observed by other CPUs and by the I/O subsystem.

A transaction may be implicitly aborted for a variety of causes, or it may be explicitly aborted by the TRANSACTION ABORT instruction. Example possible causes of a transaction abort, the corresponding abort code, and the condition code that is placed into the transaction abort PSW are described below.

External Interruption: The transaction abort code is set to 2, and the condition code in the transaction abort PSW is set to 2. The transaction abort PSW is stored as the external old PSW as a part of external interruption processing.

Program Interruption (Unfiltered): A program interruption condition that results in an interruption (that is, an unfiltered condition) causes the transaction to be aborted with code 4. The condition code in the transaction abort PSW is set specific to the program interruption code. The transaction abort PSW is stored as the program old PSW as a part of program interruption processing.

An instruction that would otherwise result in a transaction being aborted due to an operation exception may yield alternate results: for a nonconstrained transaction, the transaction may instead abort with abort code 11 (restricted instruction); for a constrained transaction, a transaction constraint program interruption may be recognized instead of the operation exception.

When a PER (Program Event Recording) event is recognized in conjunction with any other unfiltered program exception condition, the condition code is set to 3.

Machine Check Interruption: The transaction abort code is set to 5, and the condition code in the transaction abort PSW is set to 2. The transaction abort PSW is stored as the machine check old PSW as a part of machine check interruption processing.

I/O Interruption: The transaction abort code is set to 6, and the condition code in the transaction abort PSW is set to 2. The transaction abort PSW is stored as the I/O old PSW as a part of I/O interruption processing.

Fetch Overflow: A fetch overflow condition is detected when the transaction attempts to fetch from more locations than the CPU supports. The transaction abort code is set to 7, and the condition code is set to either 2 or 3.

Store Overflow: A store overflow condition is detected when the transaction attempts to store to more locations than the CPU supports. The transaction abort code is set to 8, and the condition code is set to either 2 or 3.

Allowing the condition code to be either 2 or 3 in response to a fetch or store overflow abort allows the CPU to indicate potentially retryable situations.

Fetch Conflict: A fetch conflict condition is detected when another CPU or the I/O subsystem attempts to store into a location that has been transactionally fetched by this CPU. The transaction abort code is set to 9, and the condition code is set to 2.

Store Conflict: A store conflict condition is detected when another CPU or the I/O subsystem attempts to access a location that has been stored during transactional execution by this CPU. The transaction abort code is set to 10, and the condition code is set to 2.

Restricted Instruction: When the CPU is in the transactional execution mode, attempted execution of a restricted instruction causes the transaction to be aborted. The transaction abort code is set to 11, and the condition code is set to 3.

When the CPU is in the constrained transactional execution mode, it is unpredictable whether attempted execution of a restricted instruction results in a transaction constraint program interruption or an abort due to a restricted instruction. The transaction is still aborted but the abort code may indicate either cause.

Program Interruption Condition (Filtered): A program exception condition that does not result in an interruption (that is, a filtered condition) causes the transaction to be aborted and a transaction abort code of 12. The condition code is set to 3.

Nesting Depth Exceeded: The nesting depth exceeded condition is detected when the transaction nesting depth is at the maximum allowable value for the configuration, and a TRANSACTION BEGIN instruction is executed. The transaction is aborted with a transaction abort code of 13, and the condition code is set to 3.

Cache Fetch Related Condition: A condition related to storage locations fetched by the transaction is detected by the CPU's cache circuitry. The transaction is aborted with a transaction abort code of 14, and the condition code is set to either 2 or 3.

Cache Store Related Condition: A condition related to storage locations stored by the transaction is detected by the CPU's cache circuitry. The transaction is aborted with a transaction abort code of 15, and the condition code is set to either 2 or 3.

Cache Other Condition: A cache other condition is detected by the CPU's cache circuitry. The transaction is aborted with a transaction abort code of 16 and the condition code is set to either 2 or 3.

During transactional execution, if the CPU accesses instructions or storage operands using different logical addresses that are mapped to the same absolute address, it is model dependent whether the transaction is aborted. If the transaction is aborted due to accesses using different logical addresses mapped to the same absolute address, abort code 14, 15, or 16 is set, depending on the condition.

Miscellaneous Condition: A miscellaneous condition is any other condition recognized by the CPU that causes the transaction to abort. The transaction abort code is set to 255 and the condition code is set to either 2 or 3.

When multiple configurations are executing in the same machine (for example, logical partitions or virtual machines), a transaction may be aborted due to an external machine check or I/O interruption that occurred in a different configuration.

Although examples are provided above, other causes of a transaction abort with corresponding abort codes and condition codes may be provided. For instance, a cause may be a Restart Interruption, in which the transaction abort code is set to 1, and the condition code in the transaction abort PSW is set to 2. The transaction abort PSW is stored as the restart-old PSW as a part of restart processing. As a further example, a cause may be a Supervisor Call condition, in which the abort code is set to 3, and the condition code in the transaction abort PSW is set to 3. Other or different examples are also possible.

Notes:

1. The undetermined condition may result from any of the following:

Instructions, such as, in the z/Architecture, COMPARE AND REPLACE DAT TABLE ENTRY, COMPARE AND SWAP AND PURGE, INVALIDATE DAT TABLE ENTRY, INVALIDATE PAGE TABLE ENTRY, PERFORM FRAME MANAGEMENT FUNCTION in which the NQ control is zero and the SK control is one, SET STORAGE KEY EXTENDED in which the NQ control is zero, performed by another CPU in the configuration; the condition code is set to 2.

An operator function, such as reset, restart or stop, or the equivalent SIGNAL PROCESSOR order is performed on the CPU.

Any other condition not enumerated above; the condition code is set to 2 or 3.

2. The location at which fetch and store conflicts are detected may be anywhere within the same cache line.

3. Under certain conditions, the CPU may not be able to distinguish between similar abort conditions. For example, a fetch or store overflow may be indistinguishable from a respective fetch or store conflict.

4. Speculative execution of multiple instruction paths by the CPU may result in a transaction being aborted due to conflict or overflow conditions, even if such conditions do not occur in the conceptual sequence. While in the constrained transactional execution mode, the CPU may temporarily inhibit speculative execution, allowing the transaction to attempt to complete without detecting such conflicts or overflows speculatively.

Execution of a TRANSACTION ABORT instruction causes the transaction to abort. The transaction abort code is set from the second operand address. The condition code is set to either 2 or 3, depending on whether bit 63 of the second operand address is zero or one, respectively.

FIG. 10 summarizes example abort codes stored in the transaction diagnostic block, and the corresponding condition code (CC). The description in FIG. 10 illustrates one particular implementation. Other implementations and encodings of values are possible.

In accordance with an aspect of the present invention, and as mentioned above, the transactional facility provides for constrained transactions and processing associated therewith. A constrained transaction executes in transactional mode without a fall-back path. It is a mode of processing useful for compact functions. Further details regarding constrained transactions are described below.

In the absence of repeated interruptions or conflicts with other CPUs or the I/O subsystem (i.e., caused by conditions that will not allow the transaction to complete successfully), a constrained transaction will eventually complete; thus, an abort handler routine is not required and is not specified. For instance, in the absence of violation of a condition that cannot be addressed (e.g., divide by 0); a condition that does not allow the transaction to complete (e.g., a timer interruption that does not allow an instruction to run; a hot I/O; etc); or a violation of a restriction or constraint associated with the constrained transaction, the transaction will eventually complete.

A constrained transaction is initiated by a TRANSACTION BEGIN constrained (TBEGINC) instruction when the transaction nesting depth is initially zero. A constrained transaction is subject to the following constraints, in one embodiment.

1. The transaction executes no more than 32 instructions, not including the TRANSACTION BEGIN constrained (TBEGINC) and TRANSACTION END instructions.

2. All instructions in the transaction are to be within 256 contiguous bytes of storage, including the TRANSACTION BEGIN constrained (TBEGINC) and any TRANSACTION END instructions.

3. In addition to the restricted instructions, the following restrictions apply to a constrained transaction.

a. Instructions are limited to those referred to as General Instructions, including, for instance, add, subtract, multiply, divide, shift, rotate, etc.

b. Branching instructions are limited to the following (the instructions listed are of the z/Architecture in one example):
   BRANCH RELATIVE ON CONDITION in which the $M_1$ is nonzero and the $RI_2$ field contains a positive value.
   BRANCH RELATIVE ON CONDITION LONG in which the $M_1$ field is nonzero, and the $RI_2$ field contains a positive value that does not cause address wraparound.
   COMPARE AND BRANCH RELATIVE, COMPARE IMMEDIATE AND BRANCH RELATIVE, COMPARE LOGICAL AND BRANCH RELATIVE, and COMPARE LOGICAL IMMEDIATE AND BRANCH RELATIVE in which the $M_3$ field is nonzero and the $RI_4$ field contains a positive value. (That is, only forward branches with nonzero branch masks.)

c. Except for TRANSACTION END and instructions which cause a specified operand serialization, instructions which cause a serialization function are restricted.

d. Storage-and-storage operations (SS-), and storage-and-storage operations with an extended opcode (SSE-) instructions are restricted.

e. All of the following general instructions (which are of the z/Architecture in this example) are restricted: CHECKSUM; CIPHER MESSAGE; CIPHER MESSAGE WITH CFB; CIPHER MESSAGE WITH CHAINING; CIPHER MESSAGE WITH COUNTER; CIPHER MESSAGE WITH OFB; COMPARE AND FORM CODEWORD; COMPARE LOGICAL LONG; COMPARE LOGICAL LONG EXTENDED; COMPARE LOGICAL LONG UNICODE; COMPARE LOGICAL STRING; COMPARE UNTIL SUBSTRING EQUAL; COMPRESSION CALL; COMPUTE INTERMEDIATE MESSAGE DIGEST; COMPUTE LAST MESSAGE DIGEST; COMPUTE MESSAGE AUTHENTICATION CODE; CONVERT TO BINARY; CONVERT TO DECIMAL; CONVERT UNICODE-16 TO UNICODE-32; CONVERT UNICODE-16 TO UNICODE-8; CONVERT UNICODE-32 TO UNICODE-16; CONVERT UNICODE-32 TO UNICODE-8; CONVERT UNICODE-8 TO UNICODE-16; CONVERT UNICODE-8 TO UNICODE-32; DIVIDE; DIVIDE LOGICAL; DIVIDE SINGLE; EXECUTE; EXECUTE RELATIVE LONG; EXTRACT CACHE ATTRIBUTE; EXTRACT CPU TIME; EXTRACT PSW; EXTRACT TRANSACTION NESTING DEPTH; LOAD AND ADD; LOAD AND ADD LOGICAL; LOAD AND AND; LOAD AND EXCLUSIVE OR; LOAD AND OR; LOAD PMR DISJOINT; LOAD PMR FROM QUADWORD; MONITOR CALL; MOVE LONG; MOVE LONG EXTENDED; MOVE LONG UNICODE; MOVE STRING; NON-TRANSACTIONAL STORE; PERFORM CRYPTOGRAPHIC COMPUTATION; PREFETCH DATA; PREFETCH DATA RELATIVE LONG; RUNTIME INSTRUMENTATION EMIT; RUNTIME INSTRUMENTATION NEXT; RUNTIME INSTRUMENTATION OFF; RUNTIME INSTRUMENTATION ON; SEARCH STRING; SEARCH; STRING UNICODE; SET ADDRESSING MODE; STORE CHARACTERS UNDER MASK HIGH, when the $M_3$ field is zero, and the code in the $R_1$ field is 6 or 7; STORE CLOCK; STORE CLOCK EXTENDED; STORE CLOCK FAST; STORE FACILITY LIST EXTENDED; STORE PMR TO QUADWORD; TEST ADDRESSING MODE; TRANSACTION ABORT; TRANSACTION BEGIN (both TBEGIN and TBEGINC); TRANSLATE AND TEST EXTENDED; TRANSLATE AND TEST REVERSE EXTENDED; TRANSLATE EXTENDED; TRANSLATE ONE TO ONE; TRANSLATE ONE TO TWO TRANSLATE TWO TO ONE; and TRANSLATE TWO TO TWO.

4. The transaction's storage operands access no more than four octowords. Note: LOAD ON CONDITION and STORE ON CONDITION are considered to reference storage regardless of the condition code. An octoword is, for instance, a group of 32 consecutive bytes on a 32 byte boundary.

5. The transaction executing on this CPU, or stores by other CPUs or the I/O subsystem, do not access storage operands in any 4 K-byte blocks that contain the 256 bytes of storage beginning with the TRANSACTION BEGIN constrained (TBEGINC) instruction.

6. The transaction does not access instructions or storage operands using different logical addresses that are mapped to the same absolute address.

7. Operand references made by the transaction are to be within a single doubleword, except that for LOAD ACCESS MULTIPLE, LOAD MULTIPLE, LOAD MULTIPLE HIGH, STORE ACCESS MULTIPLE, STORE MULTIPLE, and STORE MULTIPLE HIGH, operand references are to be within a single octoword.

If a constrained transaction violates any of constraints 1-7, listed above, then either (a) a transaction constraint program interruption is recognized, or (b) execution proceeds as if the transaction was not constrained, except that further constraint violations may still result in a transaction constrained program interruption. It is unpredictable which action is taken, and the action taken may differ based on which constraint is violated.

In the absence of constraint violations, repeated interruptions, or conflicts with other CPUs or the I/O subsystem, a constrained transaction will eventually complete, as described above.

1. The chance of successfully completing a constrained transaction improves if the transaction meets the following criteria:
   a. The instructions issued are fewer than the maximum of 32.
   b. The storage operand references are fewer than the maximum of 4 octowords.
   c. The storage operand references are on the same cache line.
   d. Storage operand references to the same locations occur in the same order by all transactions.

2. A constrained transaction is not necessarily assured of successfully completing on its first execution. However, if a constrained transaction that does not violate any of the listed constraints is aborted, the CPU employs circuitry to ensure that a repeated execution of the transaction is subsequently successful.

3. Within a constrained transaction, TRANSACTION BEGIN is a restricted instruction, thus a constrained transaction cannot be nested.

4. Violation of any of constrains 1-7 above by a constrained transaction may result in a program loop.

5. The limitations of a constrained transaction are similar to those of a compare-and-swap loop. Because of potential interference from other CPUs and the I/O subsystem, there is no architectural assurance that a COMPARE AND SWAP instruction will ever complete with condition code 0. A constrained transaction may suffer from similar interference in the form of fetch- or store-conflict aborts or hot interruptions.

The CPU employs fairness algorithms to ensure that, in the absence of any constraint violations, a constrained transaction eventually completes.

6. In order to determine the number of repeated iterations required to complete a constrained transaction, the program may employ a counter in a general register that is not subject to the general register save mask. An example is shown below.

|      | LH1     | 15,0       | Zero retry counter. |
|------|---------|------------|---------------------|
| Loop | TBEGINC | 0(0),X 'FE00' | Preserve GRs 0-13 |
|      | AHI     | 15,1       | Increment counter   |
|      | ...     |            | Constrained transactional-execution code |
|      | ...     |            |                     |
|      | TEND    |            | End of transaction. |

* R15 now contains count of repeated transactional attempts.

Note that both registers 14 and 15 are not restored in this example. Also note that on some models, the count in general register 15 may be low if the CPU detects the abort condition following the completion of the TBEGINC instruction, but before the completion of the AHI instruction.

As observed by the CPU, fetches and stores made in the transactional execution mode are no different than those made while not in the transaction execution mode.

Figure 11:
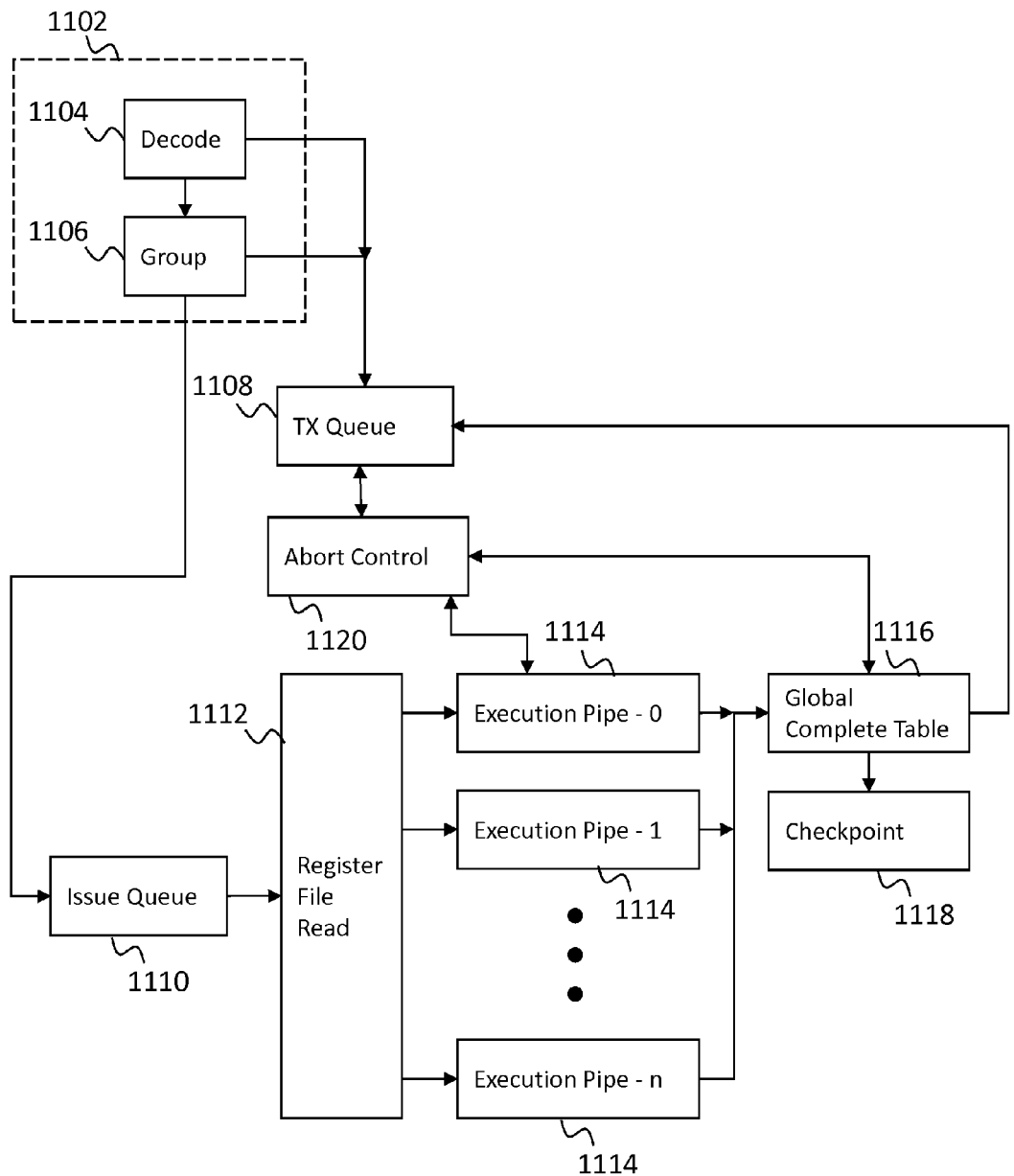
FIG. 11 depicts an out-of-order processor pipeline for processing transactions in an embodiment.

FIG. 11 depicts an out-of-order processor pipeline for processing transactions in an embodiment. The out-of-order processor pipeline includes a decode, grouping and dispatch unit 1102. The decode, grouping and dispatch unit 1102 includes a decode unit 1104. The decode unit 1104 receives an instruction and determines if it is a TBEGIN, TBEGINC, TEND, TABORT or other transactional operations. The decode unit 1104 begins the tracking process for all transactions. In an embodiment, the decode unit 1104 assigns a transactional identifier (ID) to the instruction as will be described in more detail below. In an embodiment, the decode unit 1104 interprets transaction level rules provided by an application that has issued the instruction and enforces the transaction level rules. The transaction level rules define transaction controls that are specified by the application and determine any transaction restrictions, such as the program filtering and control (PIFC) field 216 of FIG. 2, the AR modification bit (A) 212, the floating point operation bit (F) 214, etc. The decode unit 1104 additionally ensures that the transaction nesting level does not exceed the maximum hardware capacity (i.e., the maximum outer transaction and nesting level threshold), or software specified limit, by inspecting, for example, a transaction queue 1108, which is updated as described in more detail below. In some instances the transactional queue 1108 capacity may be exceeded requiring an abort, in which case an abort request is sent to the abort control 1120.

In an embodiment, for a TBEGIN instruction, the decode unit examines the GRSM mask which indicates which general purpose registers need to be saved and then decodes the TBEGIN into different constituent internal operations to be placed into the issue queue 1110 which will later access the register file 1112 and read and save off the general purpose registers into a backup location not accessible by software. The number of internal operations generated for accessing the register file 1112 is reduced when the GRSM mask indicates that not all General Purpose Registers need to be saved off. This reduces the internal pipeline bandwidth consumed by the TBEGIN instruction when software provides for a more limited number of registers to be saved by the GRSR mask.

Once the received instruction has been decoded, the grouping unit 1106 groups the instructions together and places the instruction together with any effective transactional controls pertinent to instruction execution in an issue queue 1110 tagged with the appropriate transaction ID. In an embodiment, the issue queue 1110 is a circular queue that holds instructions for processing through the out-of-order pipeline.

In an embodiment, the grouping unit 1106 also updates a transaction queue 1108 that holds the transaction effective controls for each value of i, j per thread. In an embodiment, the transaction queue is updated at few different occasions. The transaction queue is updated in instruction program order when a TBEGIN, TBEGINC, or TEND is dispatched to find the new effective control value. The transaction queue is also updated in an out-of-order way due to a pipeline flush condition such as a wrong branch direction in order to point back to the appropriate effective controls at the (i,j) location which corresponds to the oldest non-flushed instruction in the pipeline for the flushed thread. In addition, the transaction queue is updated at an abort condition or when dispatching a TABORT instruction and purging the transactional queue of all entries which correspond to the aborting thread. Aborts are signaled to the transaction queue 1108 by the abort control

1120. An abort resets the entries of the transactional queue corresponding to the aborting thread. For example if the queue is statically partitioned per thread and each thread's segment of the queue is indexed by a combination of (i,j) directly, the entire section of the queue corresponding to the aborted thread would be completely reset on an abort with both i and j equaling 0.

The out-of-order processor pipeline additionally includes a register file read unit 1112. The register file read unit 1112 reads instructions from the issue queue 1110. The issue logic pulls out instructions from the issue queue 1110 in out of program order and issues the oldest ready to issue instructions to the execution units. Once instructions are issued, register operands are read from the register file and their data is sent to execution units 1114, which may include but are not limited to one ore more load and store units (LSU) and arithmetic and logical units (ALU). In an embodiment, an instruction is ready to be processed if all associated operands for the instruction are available and all required resources are available.

When the execution units 1114 are not able to successfully execute the transactional instruction due to resource limitations such as when transaction specific tracking mechanisms are full, the transaction may be stalled meaning the instruction execution or processing may be delayed. During and after the execution of the instruction, the execution units 1114 may track references to storage made via instruction storage operands by tracking storage addresses, cache directory locations, or other mechanisms meaningful to the storage access design of the processor. In one embodiment, multiple threads or processors may be attempting to access shared storage locations concurrently and the tracking of storage references may be required to ensure that transactional accesses are protected against accesses by other threads or processors until the transaction ends. If a potential collision is detected between a transactional instruction storage access and other thread or processor, or when a resource required for execution of a transactional instruction has exceeded manageable capacity an abort is requested by execution units 1114 by signaling the abort control 1120. When signaling the abort control 1120, the execution units 1114 may provide an indication for the reason for the abort. In one embodiment, the abort reason is retrieved by the abort control from an accessible register during abort processing.

The execution pipelines execute the instructions and update a global complete table 1116 once instructions finish executing. Instructions are completed from the global complete table (GCT) in program order once they finished execution. Execution units 1114 may also detect exceptions during execution which may result in a transaction abort. In one embodiment, the execution units 1114 signal the GCT 1116 of the exception condition during execution. The GCT 1116 then signals the abort control 1120 of the abort condition once the instruction for which the exception was detected is determined to be non-speculative. Completion logic in the GCT monitors for TEND completion and reports back to dispatch logic 1102 along with the value of (i,j,t) for the completing TEND. Completion logic in GCT 1116 issues pipeline flushes for various reasons for example resolving the target of a mis-predicted branch instruction, and as a result the TX queue 1108 is updated to the (i,j) value of the oldest non-flushed group of instructions for the thread corresponding to the oldest non-flushed transaction ID, and any younger transaction queue entries for the thread are purged in program order from the transaction queue. Once the global complete table 1116 has been updated, a checkpoint unit 1118 determines if any errors have occurred (bit flips, data errors, exceptions, etc.) and sets a recovery checkpoint.

Figure 12:
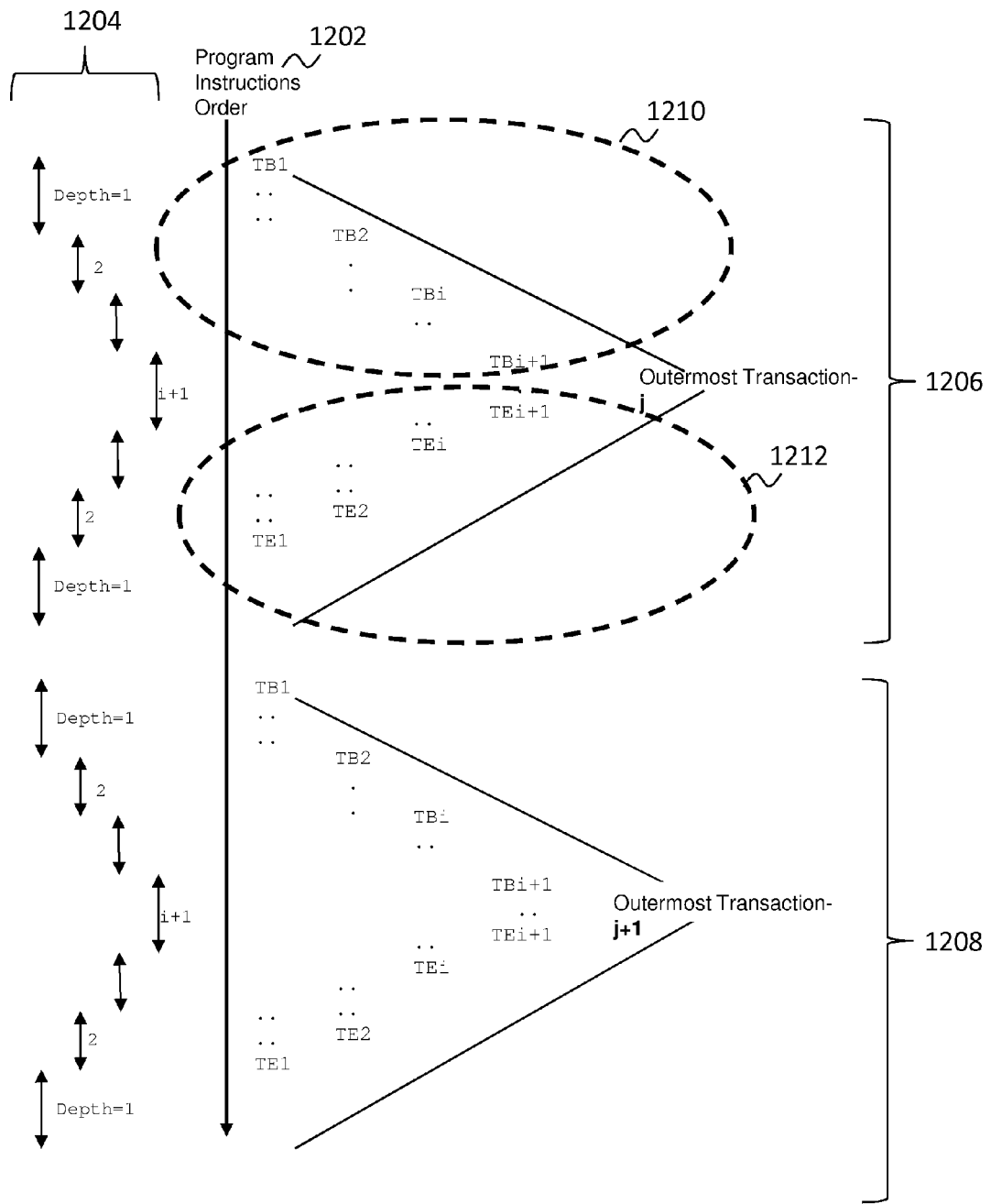
FIG. 12 depicts an example of transaction nesting in an embodiment.

FIG. 12 depicts an example of transaction nesting in an embodiment. The instructions are executed in order based on the program instruction order (i.e., the order in which the program issues the instructions) per thread. For each transaction begin (TBEGIN(C)) instruction 1210, the nesting depth 1204 (i) is increased by one. For each transaction end (TEND) instruction 1212, the nesting depth 1204 decreases by one. When a first outer transaction 1206 is started, j is increased by one. When a second outer transaction 1208 is started, j is increased by one. As each of the first outer transaction 1206 and the second outer transaction 1208 are completed j is decremented by 1.

FIG. 13 depicts an example of transaction nesting with multiple depths in an embodiment. TBEGIN-depth1 1302 begins the first transaction. TBEGIN-depth2 1304 increases the depth to two by starting a nested transaction. TBEGIN-depth3 1306 increases the depth to three. When TEND-depth3 1308 is received the transaction is ended, and the depth is reduced to 2. When the next transaction begin is received TBEGIN-depth3 1310, the nesting depth is once again increased to 3. The depth fluctuation continues with the next transaction end TEND-depth3 1312, and the subsequent transaction begin TBEGIN-depth3 1314. In an embodiment, the TX queue 1108 will have more than one value for a given (i,j) per thread. In other words, the effective controls at i=3 1306, 1310 and 1314 are not necessary the same value and thus require additional entries to track the same dimension two or more times within the TX issue queue 1108 (e.g. i,j,k). This fluctuation of nesting depth is avoided or limited by managing a down(j) state indicator. The down(j) indicator, if set, will prevent the nesting depth from increasing as long as there is a TEND instruction in the GCT that is not yet completed for the outermost transaction j. In one embodiment, the down(j) state is set when a TEND is dispatched and the nesting depth is not 0 (i.e., TEND is not the outermost TEND of a transaction). Because the instructions that are completed are not flushed, an embodiment allows for any flush or completion request with an (i,j) value to match exactly one corresponding entry in the queue and in the pipeline per thread, thus allowing for simplification of the hardware design by allowing for the transaction ID to be identified directly from (i,j).

In an alternative embodiment, a unique transaction ID is managed and assigned from a free pool to keep track of each unique transaction. The down(j) state may be used to limit the occurrence of fluctuation to limit the total set of active transactional entries consumed by a single thread, for example, down(j) may be set once there remain less then max(i) minus i entries left for a given software thread within the queue and a depth fluctuation is detected.

Figure 14:
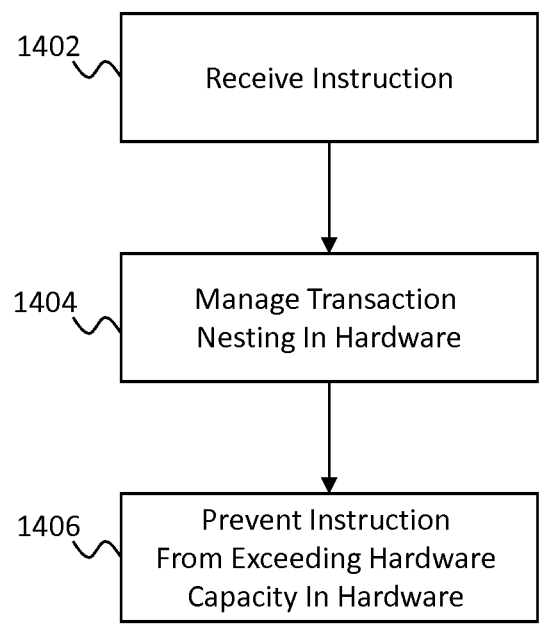
FIG. 14 depicts a process flow for managing multiple nested transactions in an embodiment.

FIG. 14 depicts a process flow for managing multiple nested transactions in an embodiment. In an embodiment, the process flow of FIG. 14 is executed by the out-of-order processor pipeline including the decoding, grouping and dispatch unit 1102 of FIG. 11. At block 1402, an instruction is received. In an embodiment, the instruction is received from a software application executing on the processor. At block 1404, the nesting of transactions is managed in hardware based on the instruction type of the instruction (i.e., TBEGIN, TEND, etc.). In an embodiment, the management of the nesting of instructions ensures, for example, that the nesting depth as well as the maximum number of outermost transactions are tracked and maintained as will be described in more detail below. At block 1406, the decoding, grouping and dispatch unit 1102 prevents the received instruction from exceeding the hardware capacity by, for example, ensuring that the maximum nesting depth and the maximum number of outer transactions is not exceeded or causing an abort if the maximum configured capacity for transactions is exceeded. In an embodiment, the maximum nesting depth and anticipated requirements for handling multiple outer transactions in near proximity are configured by a software instruction, or by the hardware itself as will be described in more detail below.

FIGS. 15A-15D depicts a detailed process flow for managing multiple nested transactions for a given thread in an embodiment. In an embodiment, the process flow of FIGS. 15A-15D is executed by the out-of-order processor pipeline including the decoding, grouping and dispatch unit 1102 of FIG. 11. At block 1502, i and j are counts initialized to zero for each running thread, and their maximum values are defined. As stated above, the maximum values of i and j are set by configuration, through a software initiated instruction, or dynamically based on execution. At block 1504, the instruction is decoded (i.e., the instruction type is determined), it is tagged, and it is dispatched. In an embodiment, the instruction is tagged with an identifier (ID). In an additional embodiment, the instruction is tagged with its transaction depth (i) and the outermost transaction (j), in this usage j is a unique id and represents a unique identifier for the outermost transaction that it belongs to. In an embodiment, the instruction may also be tagged with a sequence number to indicate its execution order.

At block 1506 it is determined if the instruction is a TBEGIN instruction, which indicates the beginning of a transaction. If the transaction is a TBEGIN transaction, then processing continues at block 1508. At block 1508, it is determined if the nesting depth (i) of the TBEGIN instruction is zero. If i is zero, then the TBEGIN instruction marks the beginning of a new outermost transaction and at block 1510 j is incremented. At block 1512, it is determined if j is equal to the maximum number of allowed transaction groupings as defined at block 1502 above. The actual index (j) assigned to the outermost transaction is not equivalent to the current j count, but the incrementing of the count j happens concurrently with the assignment of a new value of j, such as when a circular assignment queue is used as is known to those skilled in the art. If j is less than the maximum number of transactions, then processing continues at block 1526 (FIG. 5B). Otherwise, at block 1514, processing is paused until at least one outermost transaction is completed. Once a transaction has completed, processing continues at block 1526.

At block 1526, the effective transaction controls are updated. The transaction controls are specified by the application and define any transaction restrictions, such as the program filtering and control (PIFC) field 216 of FIG. 2, the AR modification bit (A) 212, the floating point operation bit (F) 214, etc. These controls are set for each value of the indexes (i,j) and are carried over with the instructions for their executions. The effective transactional controls at level (i,j) are computed based on the cumulative effect of the effective transactional controls at level (i−1,j), together with fields specified by the TBEGIN instruction and controls specified otherwise by software for the thread.

At block 1528, the instruction is tagged with its i and j values and is dispatched for execution. At block 1530, the instruction is executed and is either made ready for completion or marked for flushing if for example a branch wrong direction occurs. At block 1544, when a flush is indicated, the instruction with a value of (i,j) and all younger instructions in the pipeline for the specific thread, t, are flushed. At block 1546, the flush, along with the indexed i and j values are reported to the transaction queue 1108 of FIG. 11 and to block 1526 where the instruction status is updated along with the current transaction effective controls. At block 1548, the next instruction is processed beginning at block 1504. Returning to block 1530, after execution, the instruction is completed. At block 1534, the completed instruction is reported to the transaction queue 1108 and the status of the instruction is updated. At block 1536, it is determined if the instruction was a TEND instruction, and if i equals zero. At block 1540, if the instruction is a TEND instruction, and i equals zero, then the last instruction in the transaction has been completed, and the transaction is committed (i.e., the changes of all of the instructions are fully applied to the cache memory) and j is decremented. Processing then continues at block 1514 where any instruction that is on hold waiting for a transaction to complete is released and processed. Returning to block 1541, a flag is set to indicate that the previous transaction was successful. Continuing to block 1542, the next transaction is processed starting at block 1504. Returning to block 1536, if the instruction is not a TEND instruction or i des not equal 0, then the next transaction is processed at block 1504.

Figure 15A:
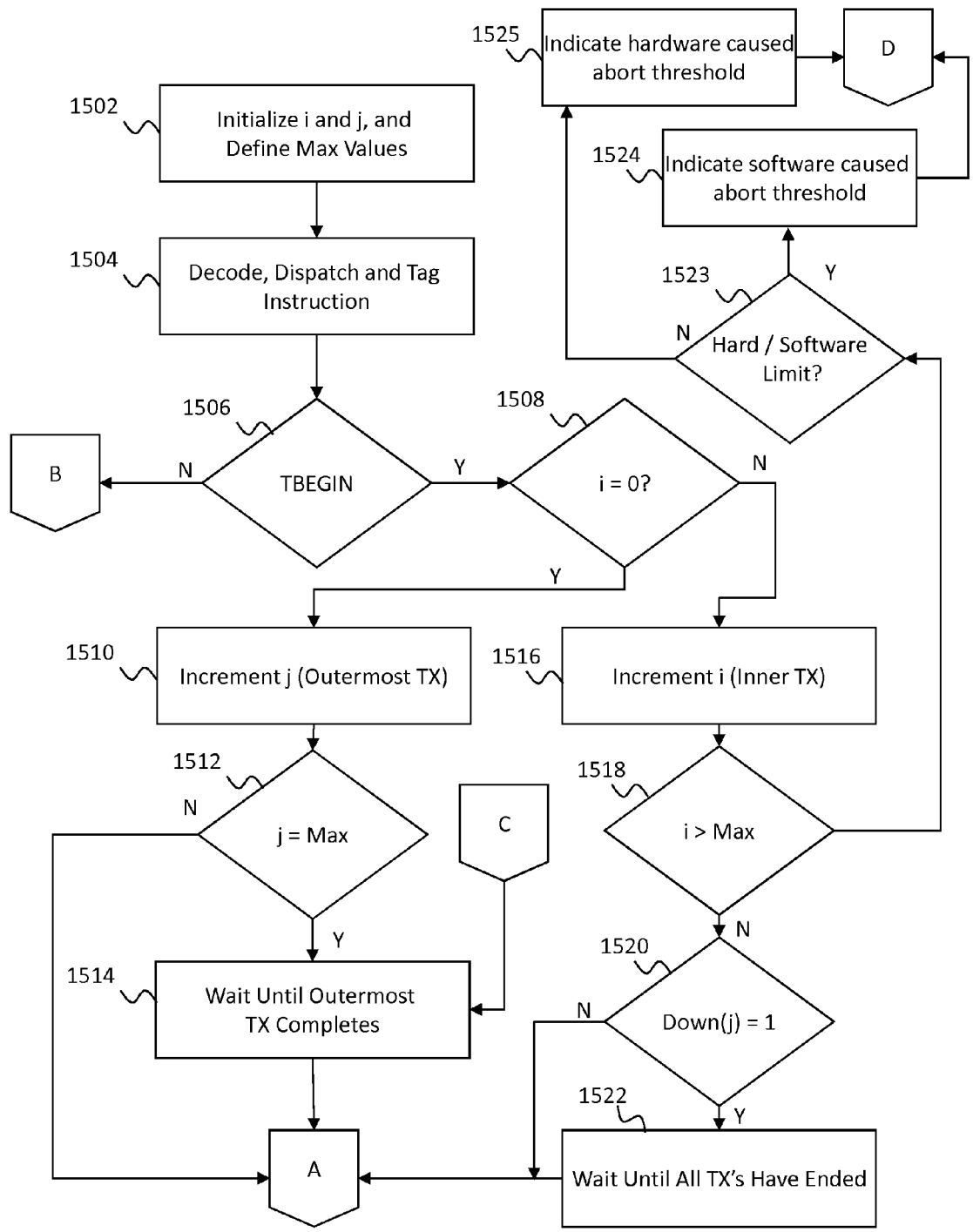
FIGS. 15A-15D depict a process flow for managing multiple nested transactions in an embodiment.
Figure 15B:
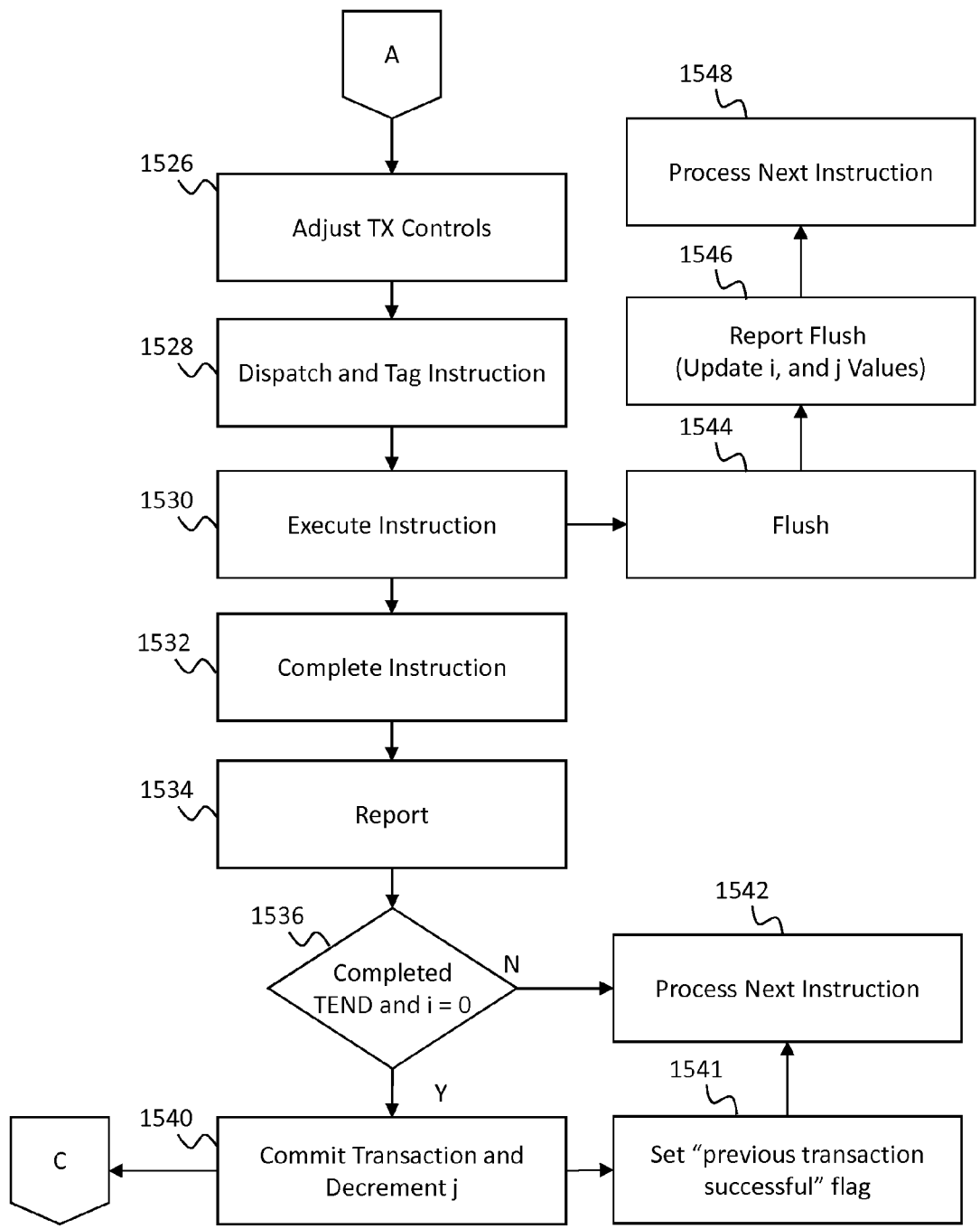
Figure 15C:
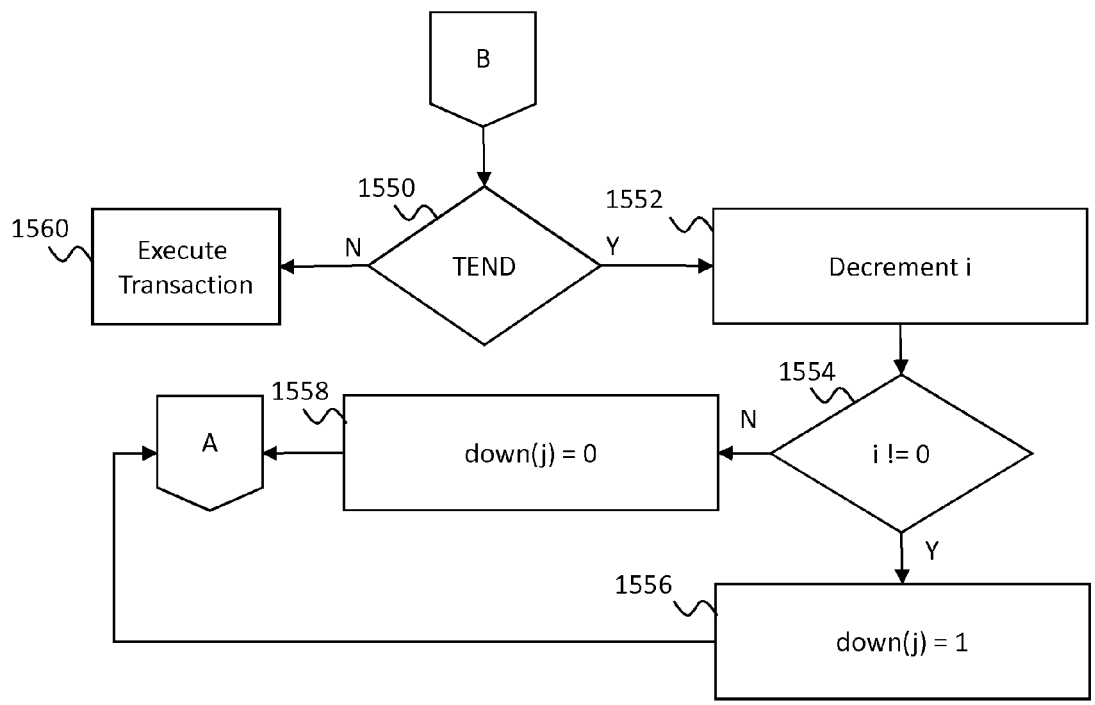

Returning to block 1506, if the instruction is not a TBEGIN instruction, the processing continues at block 1550 (FIG. 15C). At block 1550, it is determined if the instruction is a TEND instruction. At block 1552, if the instruction is a TEND instruction, then the current transaction will end once the instruction is processed and the nesting depth (i) will be reduced. At block 1554, it is determined if i=zero. If i does not equal zero then the TEND instruction will cause an inner transaction to be completed and the down(j) state is set at block 1556. As described above, the down(j) state prevents the nesting depth from increasing once it begins to decrease. Processing then continues at block 1526 (FIG. 15B). Returning to block 1554, if i=0, then the outermost transaction will be completed once this instruction is processed and, at block 1558, the down(j) state is reset to zero to indicate that nesting depth can once again begin to increase. Processing then continues at block 1526 (FIG. 15B) where the next transaction is processed. Returning to block 1550, if the instruction is not a TEND transaction, then the instruction is executed at block 1560.

Figure 15D:
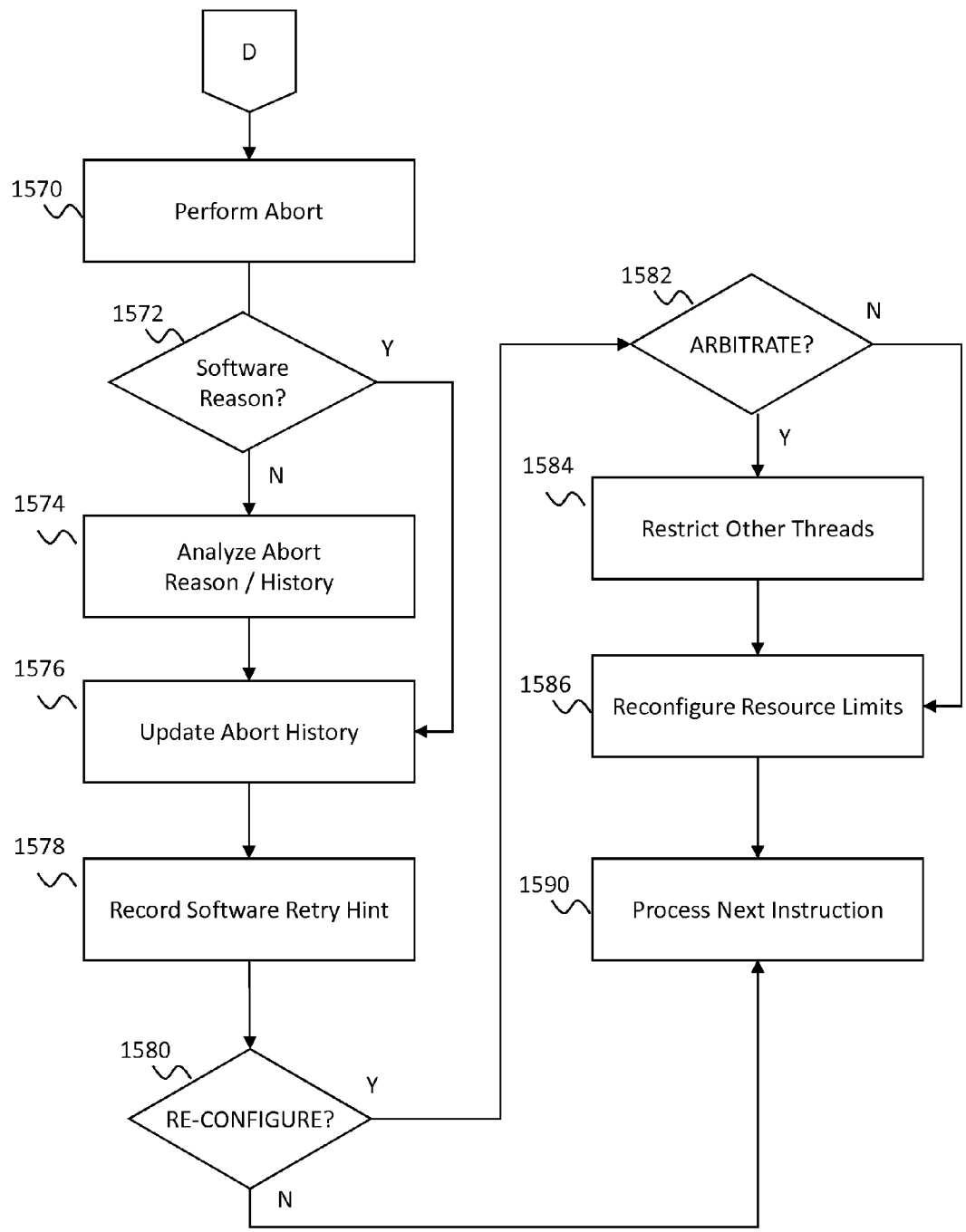

Returning to block 1508 (FIG. 15A), if i does not equal zero, then at block 1516 i is incremented to indicate a new inner transaction has begun. At block 1518, it is determined if i is greater than the max allowable value for i. If i is greater than the max allowable value for i, then at block 1523, it is determined if i exceeds the hard limits specified by software or dictated by total hardware resources and if so, processing proceeds at block 1524 where the software limit reason is recorded. At block 1524, the indication and abort reason are reported to the abort control function at block 1570 (FIG. 15D). Returning to block 1523, if i is not greater than hard limits but only exceeded the current configuration, then processing proceeds to block 1525 where the abort reason is recorded as due to configuration and the abort is reported to the abort control function at block 1570 (FIG. 15D). Returning to block 1518, if i is less than or equal to the max value, then at block 1520 it is determined if the down(j) state is active (i.e., set to one). If the down(j) state is one, then at block 1522 the instruction waits until all TEND instructions corresponding to outermost transaction j are completed, after which processing continues at block 1526 (FIG. 15B).

Returning to block 1570 (FIG. 15A), when a transactional abort condition is detected, the abort control function receives the abort request and initiates abort processing to reset transactional processing states. The abort control function may be implemented in hardware, or partly in hardware and partly in firmware.

At block 1572, the reason for the abort is determined by the abort control function based on the source of the abort and the detailed abort reason provided by the aborting unit. The abort reason could be due to any number of conditions such as those that might be provided by an LSU due to transactional storage tracking overflow, potential storage collision with another thread or processor, or by conditions such as an exception, or by exceeding the hardware capacity for tracking nested transactions. If proceeding from blocks 1524 or 1525, then the abort was originated due to exceeding the capacity for tracking nested transactions. At block 1572, the abort source and reason is inspected to determine if software alone was the cause for the abort, for example the abort reason indicated by block 1524 will indicate a software reason for abort, whereas an abort reason indicated by block 1525 indicates a non-software reason for the abort. From block 1572, if the abort reason was due to software, then processing continues at block 1576 after looking up the software return hint based on a static mapping of the abort reason. If the abort reason is not due to software then processing continues at block 1574.

At block 1574, the abort control function employs an algorithm for making abort handling decisions about what transaction retry hint (e.g. CC) to provide to the program, whether to reconfigure the hardware for future transactions, and whether to enable arbitration mechanisms to allow for progress between different threads. Inputs to making these decisions include but are not limited to the current abort reason, heuristic indicators for abort retry success, and a history of recent aborts. A transaction identifier such as the address of the outermost TBEGIN may be used for correlation and validation of the history relative to the current aborting transaction. History may include a counter for relevant categories of abort reasons, indicating the number of times the same transaction may have aborted, as well as other information about previous aborts such as storage collisions addresses captured during storage collision detection, or counters indicating the number of instructions executed within the transaction before it aborted. History is maintained per thread, but the decision making algorithm can examine the aggregate history across multiple threads in making decisions. The accuracy of the transaction abort history for use by each thread may be validated with a "previous transaction successful" flag that is set by hardware when a transaction is successfully completed without the need for abort processing. If the "previous transaction successful" flag is set when abort processing begins it can be used to clear history counters and/or validity. If a temporary hardware configuration was previously established, reconfiguration may also take place as in block 1586 at the time of a successful transaction. For purposes of hardware verification, engineering modes may also be employed to force the software hint, reconfiguration settings and thread arbitration to fixed values to facilitate various test scenarios and methods. In one embodiment, an engineering mode provides verification testing with modes to force the retry of specific types of hardware abort overflow conditions to facilitate stress testing of the abort scenarios and transactional hardware resources.

Continuing at block 1574, in an embodiment, the algorithm employed utilizes a lookup table for each encoded abort reason to make abort handling decisions. The lookup table index is a function of the abort reason and the current hardware configuration pertinent to the abort. In one embodiment, the abort reason indexes a first table of relevant hardware states, and the encoded state value combined with the abort reason is then used to index a second table that provides the abort handling decisions. If implemented in hardware or firmware, the decision table may be configurable to allow for performance tuning of the system. For the abort indicated by block 1525, a first table is indexed based with the abort reason reporting the current allocations of max(i) and max(j) and the maximum entries for the thread. The second table is then indexed using the resulting parameters along with the abort reason providing the abort control decisions. The table lookups will provide an indication that the transaction should be retried (since nesting overflows due to configuration are correctable), and a configuration with an increased number of max(i) is selected. If progress requires securing resources from another thread, then a "thread arbitration required" flag will be set for the transactional nesting facility. For other abort reasons, and other embodiments, decisions for whether to retry the software transaction can be based on heuristics that indicate for example how many times and under what conditions it may be beneficial for the transaction to be retried.

Returning to block 1576 where the abort history is updated to record relevant attributes of the current abort condition including the abort reason and any relevant abort counters are updated.

At block 1578, the decision made previously either at block 1574 or at block 1572 regarding whether to indicate to the software program that the transaction should be retried is conveyed to the software by, for example, setting a CC value for the program.

At block 1580, if a decision was made in block 1574 to reconfigure the hardware state then processing will continue at block 1582, and if not then from block 1590 instruction processing continues at block 1504.

Returning to block 1582, if the "thread arbitration required" flag was set previously in block 1574, then processing continues in block 1584, otherwise processing continues in block 1586.

Returning to block 1584, in one embodiment, one or more threads may have transactional activity quiesced or restricted until reconfiguration occurs allowing sufficient resources for the aborted thread to re-execute with higher or a guaranteed probability of success depending on the scenario and the embodiment. Once the thread restrictions are in place processing continues at block 1586.

At block 1586, resource limits are re-configured in the hardware. As a result of the abort processing, the re-configuration state is identified at block 1574, but may also take into account hints provided by the software for how to configure resources. For example when the software program specifies a max(i) as a hint then the hardware may start with that limit and use it as the default configuration when no resource based aborts are encountered. In lieu of a software hint, performance or heuristic data may be utilized to select the default hardware resource configuration for a given thread. In one embodiment, once an abort occurs which exceeds the currently configured limit, the hardware sets max(i) to the hard software limit (restricted limit) or hardware resource limit (whichever is smaller) and until the program accessing the thread is moved from active operation on the processor. In an alternate embodiment, resources allocations may be increased incrementally toward a maximum defined limit and again reduced over time when no aborts are encountered to tune the hardware resource allocations to match the software program and provide optimal performance. From block 1590, processing of the next instruction continues back at block 1504.

An embodiment includes a system for implementing processor management of transactions. The system includes a processing circuit configured to perform a method. The method includes receiving an instruction from a thread. The instruction includes an instruction type, and executes within a transaction. The transaction effectively delays committing stores to memory until the transaction has completed. A processor manages transaction nesting for the instruction based on the instruction type of the instruction. The transaction nesting includes a maximum processor capacity. The transaction nesting management performs enables executing a sequence of nested transactions within a transaction, supports multiple nested transactions in a processor pipeline, or generates and maintains a set of effective controls for controlling a pipeline. The processor prevents the transaction nesting from exceeding the maximum processor capacity.

The embodiment additionally includes a maximum processor capacity for all threads of the processor which includes a fixed size limiting a total number of active transactions being tracked including a number of outermost transactions a transactional depth of each, and a maximum number of software threads.

The embodiment further includes automatically reconfiguring the processor based on a configuration instruction from an application. The configuration instruction includes a maximum transaction depth and a maximum number of outermost transactions. The maximum transaction depth is determined by a hint provided by software, the hint includes a value less than the maximum processor capacity and is utilized by the processor for automatic reconfiguration.

The embodiment additionally includes a maximum transaction depth and a maximum number of outermost transactions per thread which is configured dynamically by the processor based on, processor requirements, performance history, an abort that is due to exceeding the processor capacity; and heuristic algorithms.

The embodiment additionally includes a number of outstanding outer most instructions, a current nesting depth within each outermost transaction, and effective transaction controls that are tracked in the processor.

The embodiment further includes decrementing the current nesting depth as each inner transaction is completed. New inner transactions are prevented until all transaction ending instructions are completed. The current outer most transaction count is decremented when an outermost transaction is completed, and the effective transaction controls are updated for each transaction nesting depth.

The embodiment additionally includes an abort processing circuit that aborts the transaction and provides an indication to software that the transaction should not be retried when the maximum transaction depth is exceeded but may be retried when the processor will be reconfigured.

An embodiment further includes detecting that a transactional capacity is exceeded based upon inter-thread capacity contention. Based on detecting that a transactional capacity is exceeded performing one of: providing an indication to an application transmitting the transaction indicating that the transaction may be retried; reconfiguring resources to increase capacity for the thread to allow the transaction to continue; and aborting the transaction and providing an indication to the application transmitting the transaction that the transaction may be retried when a maximum transaction depth is not exceeded, but allowing a current processor configuration to be exceeded.

The embodiment additionally includes detecting that a transactional capacity is exceeded based upon inter-thread capacity contention. Arbitrating inter-thread progress to allow for processor reconfiguration of per thread capacity. Reconfiguring processor capacity to increase the maximum processor capacity and then retrying the transaction.

Technical benefits include the ability to manage multiple nested transactions in hardware in a transaction processing system. An additional benefit includes the ability to limit a maximum transaction depth level and the maximum number of outermost transactions based on configurable values. A further benefit includes managing the transaction nesting hierarchy in hardware, thereby relieving software of the complexity of managing transaction nesting.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 16:
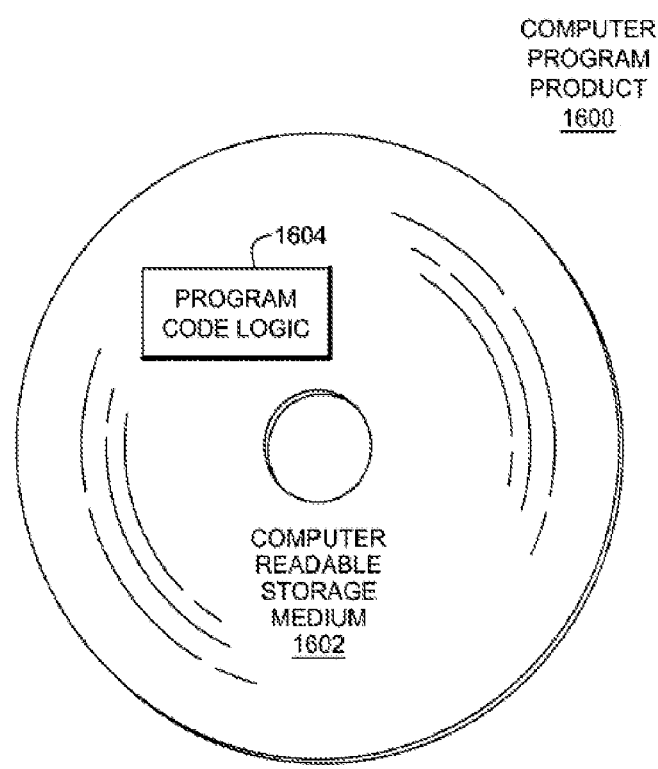
FIG. 16 depicts one embodiment of a computer program product incorporating one or more aspects of the present invention.

Referring now to FIG. 16, in one example, a computer program product 1600 includes, for instance, one or more non-transitory computer readable storage media 1602 to store computer readable program code means or logic 1604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, different instructions, instruction formats, instruction fields and/or instruction values may be used. Moreover, different, other, and/or additional restrictions/constraints may be provided/used. Many variations are possible without departing from a spirit of one or more aspects of the invention.

Further, other types of computing environments can benefit from one or more aspects of the present invention. As an example, a data processing system suitable for storing and/or executing program code includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 17:
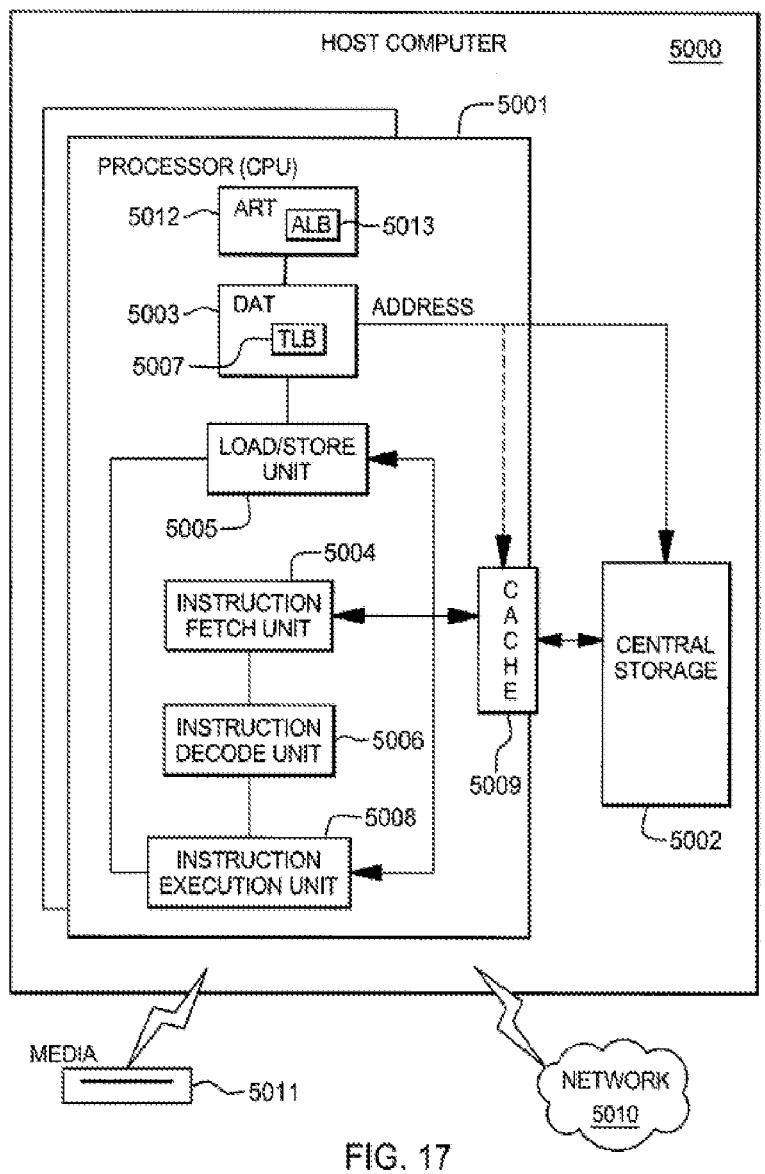
FIG. 17 depicts one embodiment of a host computer system to incorporate and use one or more aspects of the present invention.

Referring to FIG. 17, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 17, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 18:
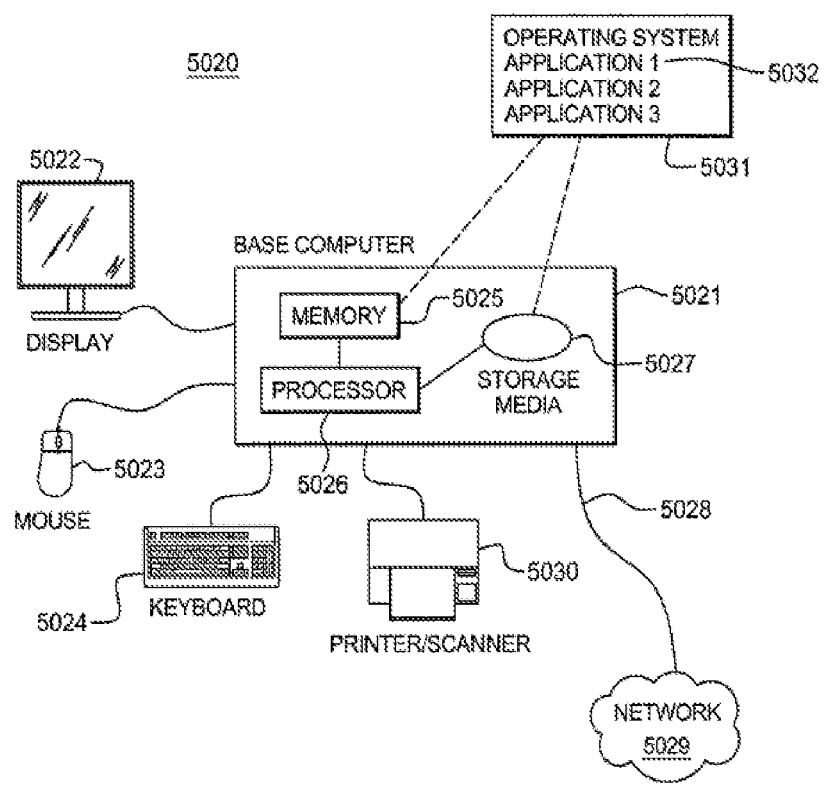
FIG. 18 depicts a further example of a computer system to incorporate and use one or more aspects of the present invention.

FIG. 18 illustrates a representative workstation or server hardware system in which one or more aspects of the present invention may be practiced. The system 5020 of FIG. 18 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 19:
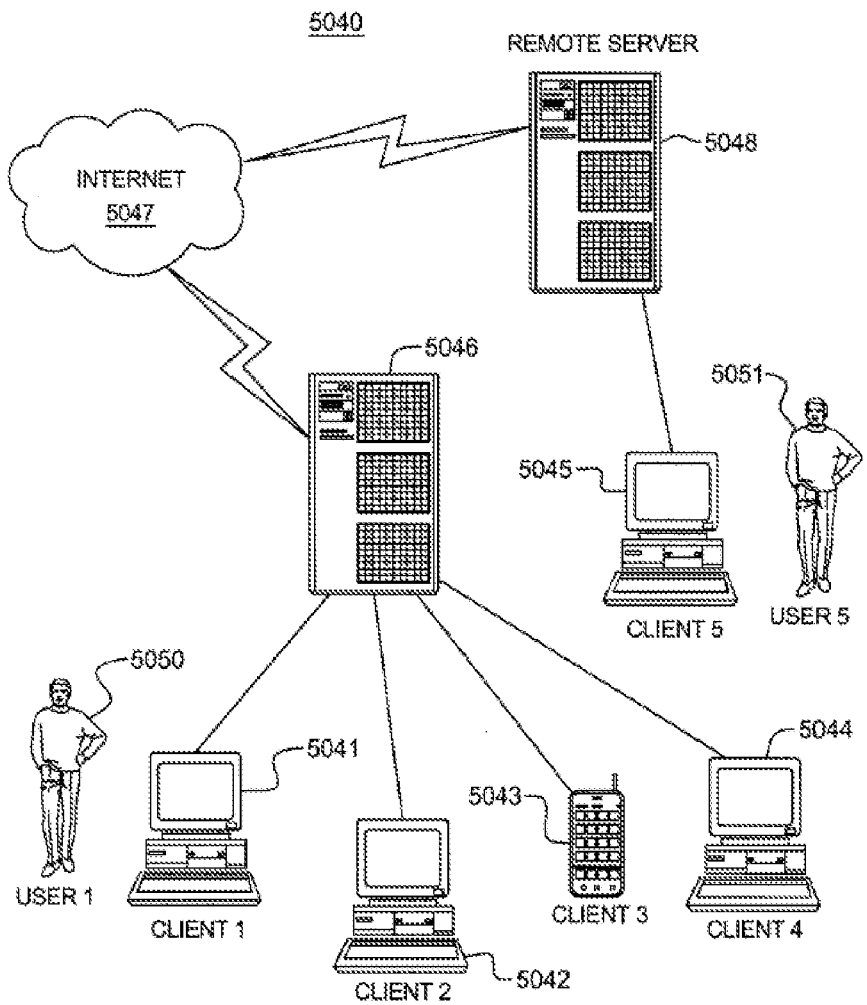
FIG. 19 depicts another example of a computer system comprising a computer network to incorporate and use one or more aspects of the present invention.

FIG. 19 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 19, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer System z server available from International Business Machines Corporation.

Referring concurrently to FIG. 18 and FIG. 19, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 20:
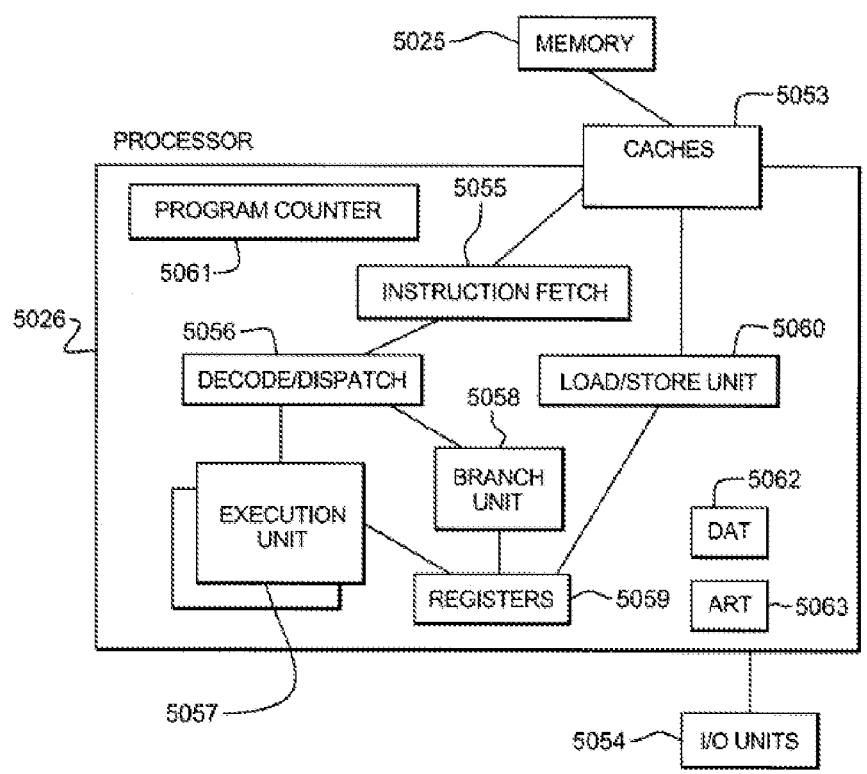
FIG. 20 depicts one embodiment of various elements of a computer system to incorporate and use one or more aspects of the present invention.

Referring to FIG. 20, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Program addresses (e.g., virtual addresses) are transformed into real addresses using dynamic address translation 5062 and/or access register translation 5063.

Figure 21A:
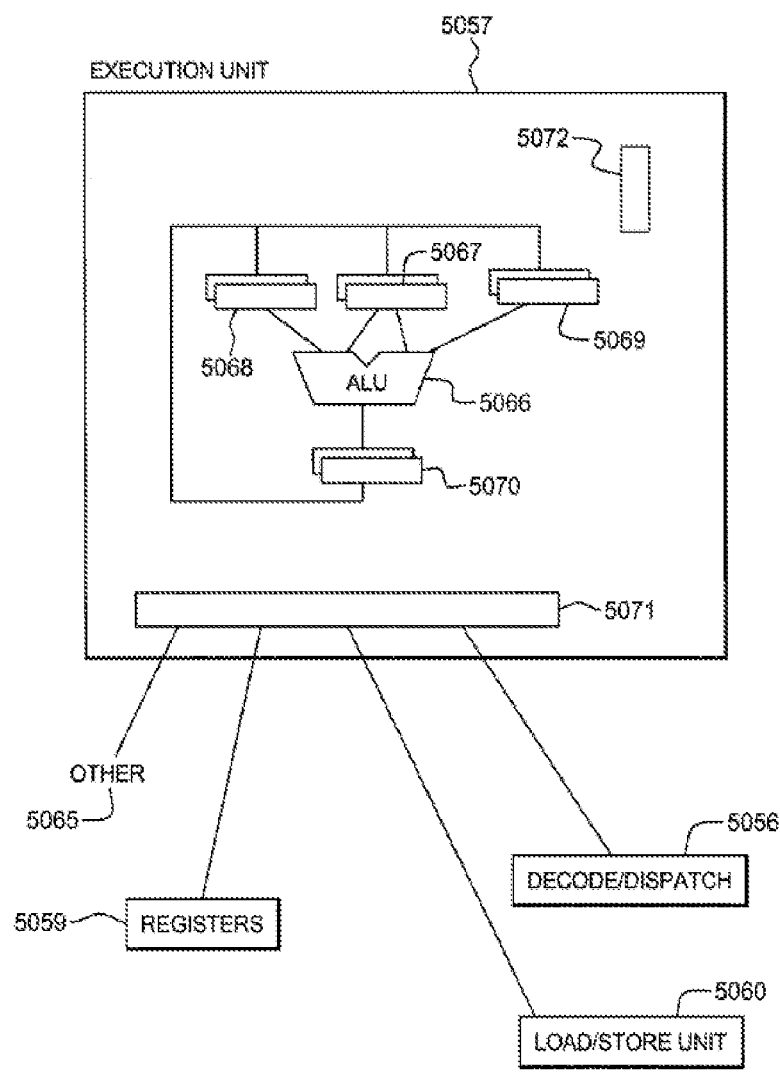
FIG. 21A depicts one embodiment of the execution unit of the computer system of FIG. 20 to incorporate and use one or more aspects of the present invention.

A processor 5026 typically has one or more units 5057, 5058, 5060 for executing the function of the instruction. Referring to FIG. 21A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units; the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 21B:
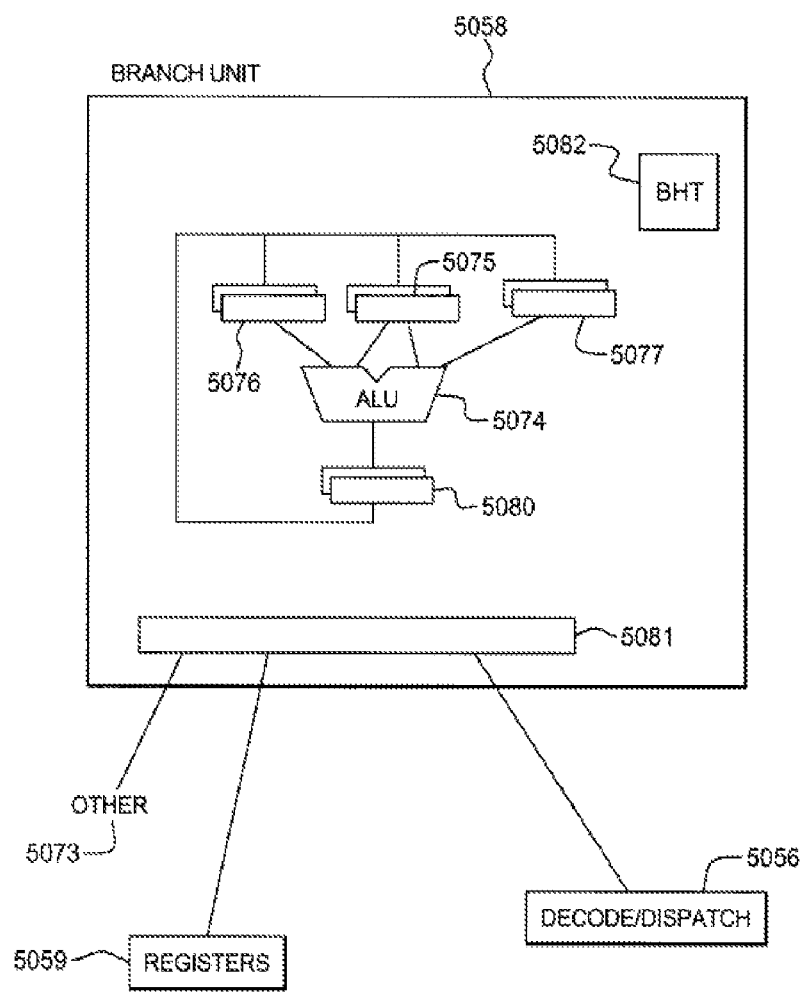
FIG. 21B depicts one embodiment of the branch unit of the computer system of FIG. 20 to incorporate and use one or more aspects of the present invention.

Referring to FIG. 21B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 21C:
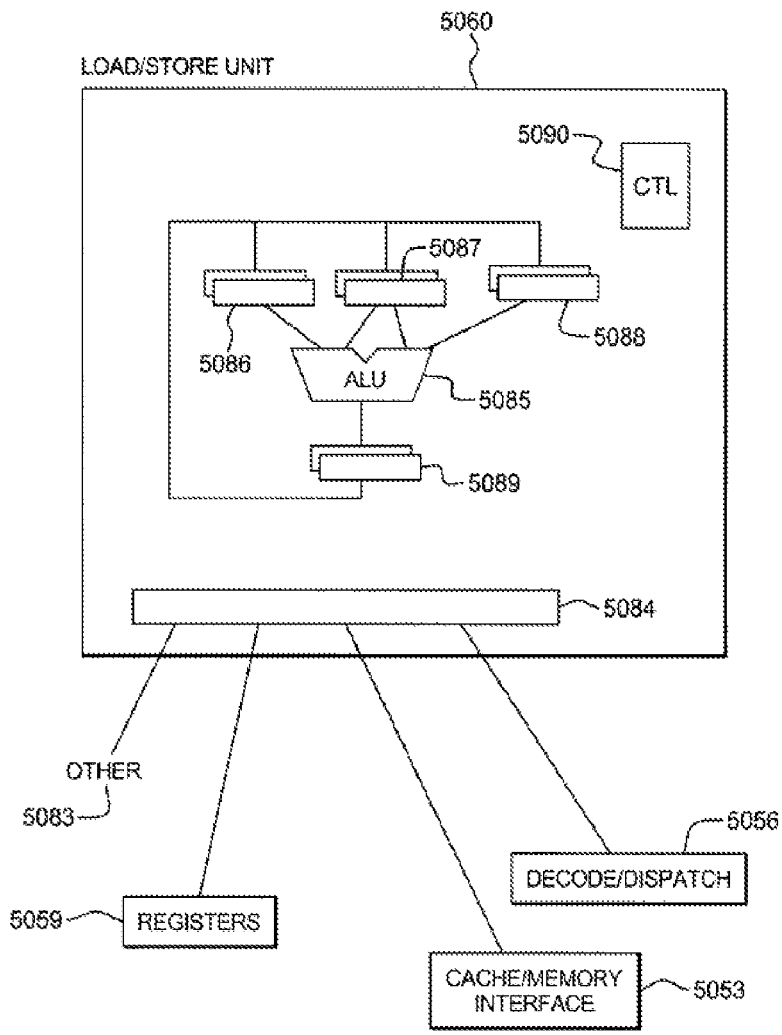
FIG. 21C depicts one embodiment of the load/store unit of the computer system of FIG. 20 to incorporate and use one or more aspects of the present invention.

Referring to FIG. 21C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence; however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 20) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x Servers). They can be executed in machines running Linux on a wide variety of machines using hardware manufactured by IBM®, Intel®, AMD, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to, U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 22:
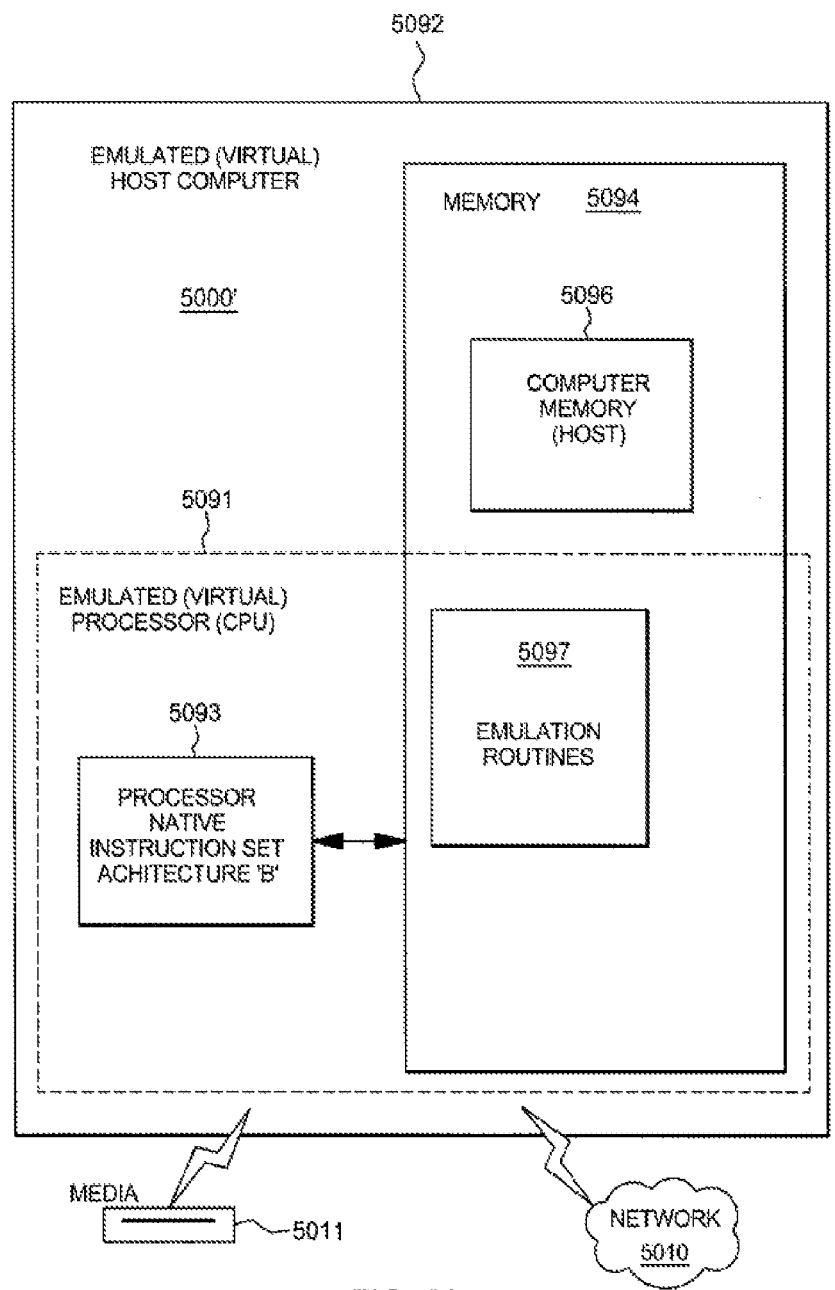
FIG. 22 depicts one embodiment of an emulated host computer system to incorporate and use one or more aspects of the present invention.

In FIG. 22, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for dynamic management of a transaction retry indication, the system comprising:
   a transactional facility configured to support transactions that effectively delay committing stores to memory or results to an architectural state until transaction completion; and a processor configured to perform a method comprising:
    identifying, by the processor, a transaction abort reason associated with an aborted transaction of an initiating program;
    tracking transaction success and a transaction abort history;
    maintaining the transaction abort history per thread across multiple threads;
    based on determining, by the processor, that the transaction abort reason was caused by the initiating program, assigning a retry indication based on a static mapping of the transaction abort reason, the retry indication providing an indication to the initiating program on whether to retry the aborted transaction;
    based on determining, by the processor, that the transaction abort reason was not caused by the initiating program, assigning the retry indication based on a retry process using the transaction abort reason, the transaction abort history, and a current processor configuration, wherein the retry process is based on heuristic indicators for abort retry success based on a likelihood of success on a retry associated with the transaction abort reason, the transaction history, and the current processor configuration, and the retry process accounts for sharing of resources between the threads and indicates that the aborted transaction should be retried based on determining that one of: resource reallocation and arbitration between the threads has a likelihood of transaction success; and
    validating an accuracy of the transaction abort history for each of the threads by setting a previous transaction successful flag when a transaction completes without abort processing and clearing the transaction abort history based on detecting that the previous transaction successful flag is set when abort processing begins.

2. The system of claim 1, wherein the heuristic indicators are configurable to enable performance tuning of the system.

3. The system of claim 1, wherein the retry process utilizes one or more of:
    a number of times that the aborted transaction has aborted;
    an indication of recent transaction success;
    counters for categories of abort reasons;
    abort collision addresses; and
    a counter indicating a number of instructions executed within the aborted transaction before it is aborted.

4. The system of claim 1, wherein the retry process is based on engineering modes to enable hardware verification, and specific abort reasons are statically assigned to specific retry indications.

5. A method for dynamic management of a transaction retry indication in a transactional facility, the method comprising:
    identifying, by a processor, a transaction abort reason associated with an aborted transaction of an initiating program;
    tracking transaction success and a transaction abort history;
    maintaining the transaction abort history per thread across multiple threads;
    based on determining, by the processor, that the transaction abort reason was caused by the initiating program, assigning a retry indication based on a static mapping of the transaction abort reason, the retry indication providing an indication to the initiating program on whether to retry the aborted transaction;
    based on determining, by the processor, that the transaction abort reason was not caused by the initiating program, assigning the retry indication based on a retry process using the transaction abort reason, the transaction abort history, and a current processor configuration, wherein the retry process is based on heuristic indicators for abort retry success based on a likelihood of success on a retry associated with the transaction abort reason, the transaction history, and the current processor configuration, and the retry process accounts for sharing of resources between the threads and indicates that the aborted transaction should be retried based on determining that one of: resource reallocation and arbitration between the threads has a likelihood of transaction success; and
    validating an accuracy of the transaction abort history for each of the threads by setting a previous transaction successful flag when a transaction completes without abort processing and clearing the transaction abort history based on detecting that the previous transaction successful flag is set when abort processing begins.

6. The method of claim 5, wherein the heuristic indicators are configurable to enable system performance tuning.

7. The method of claim 5, wherein the retry process utilizes one or more of:
    a number of times that the aborted transaction has aborted;
    an indication of recent transaction success;
    counters for categories of abort reasons;
    abort collision addresses; and
    a counter indicating a number of instructions executed within the aborted transaction before it is aborted.

8. The method of claim 5, wherein the retry process is based on engineering modes to enable hardware verification, and specific abort reasons are statically assigned to specific retry indications.

9. A computer program product for dynamic management of a transaction retry indication in a transactional facility, the computer program product comprising:
    a non-transitory storage medium readable by a processing circuit of a processor and storing instructions for execution by the processing circuit for performing a method comprising:
        identifying, by the processor, a transaction abort reason associated with an aborted transaction of an initiating program;
        tracking transaction success and a transaction abort history;
        maintaining the transaction abort history per thread across multiple threads;
        based on determining, by the processor, that the transaction abort reason was caused by the initiating program, assigning a retry indication based on a static mapping of the transaction abort reason, the retry indication providing an indication to the initiating program on whether to retry the aborted transaction;
        based on determining, by the processor, that the transaction abort reason was not caused by the initiating program, assigning the retry indication based on a retry process using the transaction abort reason, the transaction abort history, and a current processor configuration, wherein the retry process is based on heuristic indicators for abort retry success based on a likelihood of success on a retry associated with the transaction abort reason, the transaction history, and the current processor configuration, and the retry process accounts for sharing of resources between the threads and indicates that the aborted transaction should be retried based on determining that one of: resource reallocation and arbitration between the threads has a likelihood of transaction success; and validating an accuracy of the transaction abort history for each of the threads by setting a previous transaction successful flag when a transaction completes without abort processing and clearing the transaction abort history based on detecting that the previous transaction successful flag is set when abort processing begins.

10. The computer program product of claim 9, wherein the heuristic indicators are configurable to enable system performance tuning.

11. The computer program product of claim 9, wherein the retry process utilizes one or more of:
- a number of times that the aborted transaction has aborted;
- an indication of recent transaction success;
- counters for categories of abort reasons;
- abort collision addresses; and
- a counter indicating a number of instructions executed within the aborted transaction before it is aborted.

12. The computer program product of claim 9, wherein the retry process is based on engineering modes to enable hardware verification, and specific abort reasons are statically assigned to specific retry indications.

\* \* \* \* \*